(12) United States Patent
Kobayashi et al.

(10) Patent No.: US 10,363,544 B2
(45) Date of Patent: Jul. 30, 2019

(54) PARTICULATE WATER-ABSORBING AGENT

(71) Applicant: NIPPON SHOKUBAI CO., LTD., Osaka-shi, Osaka (JP)

(72) Inventors: Taishi Kobayashi, Himeji (JP); Mariko Tamaki, Himeji (JP); Hiroyuki Ikeuchi, Himeji (JP)

(73) Assignee: NIPPON SHOKUBAI CO., LTD., Osaka-Shi, Osaka (JP)

(*) Notice: Subject to any disclaimer, the term of this patent is extended or adjusted under 35 U.S.C. 154(b) by 0 days.

(21) Appl. No.: 15/300,310

(22) PCT Filed: Mar. 31, 2015

(86) PCT No.: PCT/JP2015/060266
§ 371 (c)(1),
(2) Date: Sep. 29, 2016

(87) PCT Pub. No.: WO2015/152299
PCT Pub. Date: Oct. 8, 2015

(65) Prior Publication Data
US 2017/0136441 A1  May 18, 2017

(30) Foreign Application Priority Data
Mar. 31, 2014 (JP) ................................. 2014-072936

(51) Int. Cl.
| | | |
|---|---|---|
| *B01J 20/04* | (2006.01) | |
| *C08K 3/32* | (2006.01) | |
| *C08L 101/14* | (2006.01) | |
| *B01J 20/26* | (2006.01) | |
| *B01J 20/28* | (2006.01) | |
| *C08J 3/24* | (2006.01) | |
| *B01J 20/30* | (2006.01) | |

(52) U.S. Cl.
CPC ........... *B01J 20/048* (2013.01); *B01J 20/267* (2013.01); *B01J 20/28004* (2013.01); *B01J 20/28057* (2013.01); *B01J 20/3085* (2013.01); *C08J 3/245* (2013.01); *C08K 3/32* (2013.01); *C08L 101/14* (2013.01); *C08J 2335/02* (2013.01); *C08K 2003/321* (2013.01); *C08K 2201/005* (2013.01)

(58) Field of Classification Search
CPC ......... B01J 20/04; B01J 20/048; B01J 20/267
USPC ....................................................... 502/402
See application file for complete search history.

(56) References Cited

U.S. PATENT DOCUMENTS

| | | | |
|---|---|---|---|
| 5,668,078 A | 9/1997 | Sumiya et al. | |
| 6,124,391 A | 9/2000 | Sun et al. | |
| 8,257,610 B2 * | 9/2012 | Torii | A61L 15/60 252/184 |
| 8,952,116 B2 * | 2/2015 | Kobayashi | C08K 5/098 524/437 |
| 2004/0071966 A1 | 4/2004 | Inger et al. | |
| 2004/0077796 A1 | 4/2004 | Daniel et al. | |
| 2005/0031704 A1 | 2/2005 | Ahn | |
| 2005/0215966 A1 | 9/2005 | Borgmann et al. | |
| 2006/0204755 A1 | 9/2006 | Torii et al. | |
| 2007/0106013 A1 | 5/2007 | Adachi et al. | |
| 2007/0244283 A1 | 10/2007 | Riegel et al. | |
| 2008/0125533 A1 | 5/2008 | Riegel et al. | |
| 2008/0280128 A1 | 11/2008 | Furno et al. | |
| 2010/0160883 A1 | 6/2010 | Jonas et al. | |
| 2010/0190932 A1 | 7/2010 | Riegel et al. | |
| 2010/0270501 A1 | 10/2010 | Torii et al. | |
| 2011/0114881 A1 | 5/2011 | Torii et al. | |
| 2011/0180755 A1 | 7/2011 | Adachi et al. | |
| 2013/0060230 A1 | 3/2013 | Capistron et al. | |
| 2014/0193641 A1 | 7/2014 | Torii et al. | |

FOREIGN PATENT DOCUMENTS

| | | |
|---|---|---|
| CN | 1501957 A | 6/2004 |
| CN | 103619919 A | 3/2014 |
| EP | 1335756 A | 5/2002 |
| JP | S59-080459 A | 5/1984 |
| JP | H08-47637 A | 2/1996 |
| JP | 2004-517728 A | 6/2004 |
| JP | 2007-529292 A | 10/2007 |
| JP | 2008-517116 A | 5/2008 |
| WO | WO 1995/033558 A1 | 12/1995 |
| WO | WO 2000/010619 A1 | 3/2000 |
| WO | WO 2001/074913 A1 | 10/2001 |

(Continued)

OTHER PUBLICATIONS

Notification Concerning Transmittal of International Preliminary Report on Patentability and Written Opinion dated Oct. 4, 2016, which issued in the counterpart PCT Application No. PCT/JP2015/060266, including English translation.

(Continued)

*Primary Examiner* — Edward M Johnson
(74) *Attorney, Agent, or Firm* — Dickinson Wright, PLLC

(57) ABSTRACT

It is an object to provide a particulate water-absorbing agent having a high fluid retention capacity under pressure and reduced moisture absorption blocking properties, and a method for producing the same.

A particulate water-absorbing agent including a water-insoluble metal phosphate including an anion of a phosphoric acid compound and a divalent or trivalent metal cation, the water-insoluble metal phosphate having a crystallite size of less than 0.15 μm, wherein the particulate water-absorbing agent has a fluid retention capacity under pressure of 2.06 kpa of 20 g/g or more.

13 Claims, No Drawings

(56) References Cited

FOREIGN PATENT DOCUMENTS

| WO | WO 2002/060983 A1 | 8/2002 |
|---|---|---|
| WO | WO 2004/069293 A1 | 8/2004 |
| WO | WO 2004/113452 A1 | 12/2004 |
| WO | WO 2006/111403 A1 | 12/2004 |
| WO | WO 2005/097881 A1 | 10/2005 |
| WO | WO 2009/016054 A1 | 2/2009 |
| WO | WO 2009/041727 A1 | 4/2009 |
| WO | WO 2009/041731 A1 | 4/2009 |
| WO | WO 2009/110645 A1 | 9/2009 |
| WO | WO 2012/133734 A1 | 10/2012 |
| WO | WO 2014/021388 A1 | 2/2014 |

OTHER PUBLICATIONS

International Search Report dated Jun. 30, 2015 in PCT Application No. PCT/JP2015/060266.

Official Notice of Reasons for Refusal dated Jun. 13, 2017, which issued in the corresponding Patent Application No. 2016-511964, including English translation.

M. Rajkumar et al., "Development of Nanocomposites Based on Hydroxyapatite/Sodium Alginate: Synthesis and Characterization," Materials Characterization 62 (2011) 469-479.

Debasish Mishra et al., Enzymatically Crosslinked Carboxymethyl-Chitosan/Gelatin/Nano-Hydroxyapatite Injectable Gels for in Situ Bone Tissue Engineering Application, Materials Science and Engineering C 31 (2011) 1295-1304.

Supplementary Partial European Search Report dated Oct. 9, 2017, which issued in the corresponding Patent Application No. 15773122.5.

Chinese Office Action dated Mar. 26, 2018, which issued in corresponding Patent Application No. 2015800172621, including English translation.

Neffe et al., Gelatin functionalization with tyrosine derived moieties to increase the interaction with hydroxyapatite fillers, Acta Biomaterialia 7 (2011) 1693-1701.

Extended European Search Report for related European Application No. 157731225, dated Jan. 31, 2018.

Chinese Office Action dated Mar. 1, 2019, which issued in the corresponding Chinese Patent Application No. 2015800172621, including English translation.

Indonesian Office Action dated Feb. 7, 2019, which issued in the corresponding Indonesian Patent Application No. P00201607341, including English Translation of the Indonesian Office Action.

\* cited by examiner

PARTICULATE WATER-ABSORBING AGENT

TECHNICAL FIELD

The present invention relates to a particulate water-absorbing agent with reduced moisture absorption blocking properties while maintaining a high fluid retention capacity under pressure and to a method for producing the same.

BACKGROUND ART

In absorbent articles such as disposable diapers, sanitary napkins and incontinence pads, absorbent materials using as constituent materials hydrophilic fibers such as pulp and water-absorbing resins have been widely utilized for the purpose of absorbing body fluids.

In recent years, these absorbent articles have become more functional and thinner that an amount of water-absorbing resins used in each sheet of an absorbent article, or a proportion of water-absorbing resins in the whole absorbent body, which include water-absorbing resins and hydrophilic fibers, tends to increase. This means that, reducing hydrophilic fibers, which have a smallbulk specific gravity, allows to use water-absorbing resins in large amount, which have an excellent water absorbency and a high bulk specific gravity, the proportion of water-absorbing resins within absorbent bodies increases, reducing a thickness of the absorbent articles without lowering an amount of water absorption.

Therefore, when various absorbent articles including disposable diapers, for instance, are produced using water-absorbing resins, a large amount of water-absorbing resins with high moisture absorbency had to be incorporated into fiber base materials. Thus, there has been a growing problem that, depending on the working environment and climate conditions, resin particles may cause blocking in a hopper or in the middle of a production line, or may adhere to the apparatus, causing to hinder stable production.

As a means for securing fluidity or liquid permeability (SFC or GBP) of a water-absorbing resin at the time of moisture absorption, the following are known: a technology of adding a water-insoluble metal phosphate having a particle size of several micrometers ($\mu m$) to several dozen micrometers ($\mu m$) to a water-absorbing resin (Patent Literatures 1 to 3); a technology of adding fine silica particles or clay such as kaolin (Patent Literatures 4 and 5); a technology of adding a metal soap (Patent Literature 6); a technology of adding a surfactant (Patent Literature 7); a technology of adding an organic polysiloxane (Patent Literature 8); a technology of adding an aluminum salt (Patent Literatures 9 to 11); a technology of adding a polyamine compound (Patent Literatures 12 to 15) and the like.

CITATION LIST

Patent Literatures

Patent Literature 1: WO 2002/060983 A
Patent Literature 2: WO 2005/097881 A
Patent Literature 3: WO 2009/016054 A
Patent Literature 4: WO 2000/010619 A
Patent Literature 5: JP 59-080459 A
Patent Literature 6: WO 2012/133734 A
Patent Literature 7: EP 1,335,756 B
Patent Literature 8: WO 1995/033558 A
Patent Literature 9: WO 2001/074913 A
Patent Literature 10: WO 2004/113452 A
Patent Literature 11: WO 2004/069293 A
Patent Literature 12: WO 2006/111403 A
Patent Literature 13: WO 2009/110645 A
Patent Literature 14: WO 2009/041731 A
Patent Literature 15: WO 2009/041727 A

SUMMARY OF INVENTION

Technical Problem

However, while these technologies (additives) disclosed in Patent Literatures 1 to 15 enhance fluidity or liquid permeability at the time of moisture absorption, there have been issues of lowering the fluid retention capacity under pressure of particulate water-absorbing agents or lowering the surface tension, urine resistance or coloration (degree of whiteness). Thus, a particulate water-absorbing agent with reduced moisture absorption blocking properties (caking properties) was not to be obtained while maintaining a high fluid retention capacity under pressure.

An object of the present invention is to provide a particulate water-absorbing agent having a high fluid retention capacity under pressure while with reduced moisture absorption blocking properties (anti-caking properties), and a method for producing the same.

Solution to Problem

The inventors of the present invention conducted a thorough study on the problems described above, and as a result, the inventors achieved the invention founding the following.

To be more specific, the inventors found that when water-insoluble metal phosphates that have been conventionally used as liquid permeability enhancers are processed to have a crystallite size in a particular range, to which attention has not been paid hitherto, specific moisture absorption blocking resistance properties (anti-caking properties) can be imparted, without decreasing the fluid retention capacity under pressure or without lowering surface tension, urine resistance and coloration (degree of whiteness).

Furthermore, from the viewpoint of a liquid permeability enhancing effect for the particulate water-absorbing agent, it has been speculated that in order to impart moisture absorption blocking properties (anti-caking properties), particles of a water-insoluble metal phosphate needs to be processed to have a certain particle size or larger (for example, in Patent Literature 1, a water-insoluble metal phosphate having an average particle size of 2 to 50 mm is used). However, contrary to expectations, it was found that very small particles having a crystallite size of less than 0.15 mm have a superior effect of moisture absorption blocking resistance (anti-caking), compared to a particulate water-absorbing agent having a particle size of several hundred micrometers (mm).

That is, a particulate water-absorbing agent of the present invention includes a water-insoluble metal phosphate including an anion of a phosphoric acid compound and a divalent or trivalent metal cation, the water-insoluble metal phosphate having a crystallite size of less than 0.15 $\mu m$, wherein the particulate water-absorbing agent has a fluid retention capacity under pressure of 2.06 kPa of 20 g/g or more.

Effect of the Invention

According to the present invention, a particulate water-absorbing agent which achieves a balance between the fluid retention characteristics under pressure and fluidity at the time of moisture absorption can be provided. As a result, an absorbent article having superior performance, which causes less trouble when an absorbent article such as a disposable diaper having a high concentration of a particulate water-absorbing agent is produced, can be obtained.

DESCRIPTION OF EMBODIMENTS

[1] Definitions of Terms (1-1) "Water-Absorbing Agent"

A "water-absorbing agent" according to the present specification refers to a composition which serves as a gelling agent for a water-based liquid, the composition including a water-absorbing resin as a main component (preferably in an amount of 60% by mass or more, more preferably 80% by mass or more, and even more preferably 90% by mass or more per the total amount of the water-absorbing agent), and further including, as optional components, additives such as water, inorganic fine particles, a cationic polymer compound, a water-soluble polyvalent metal cation-containing compound, a surfactant, a coloration inhibitor, a urine resistance enhancer, a deodorant, a fragrance, an antibacterial agent, a foaming agent, a pigment, a dye, a fertilizer, an oxidizing agent and a reducing agent, respectively at a proportion of 0% to 10% by mass, and preferably 0.1% to 1% by mass. Meanwhile, the water-absorbing agent having a particulate shape is particularly referred to as "particulate water-absorbing agent".

(1-2) "Surface Crosslinked Water-Absorbing Resin"

A "surface crosslinked water-absorbing resin" according to the present specification is a gelling agent for a water-based liquid, which is obtained by subjecting a water-absorbing resin to a surface crosslinking step, and a water-absorbing resin obtained by performing a surface crosslinking step after a step for adding a surface crosslinking agent, is also referred to as surface crosslinked water-absorbing resin.

(1-3) "Water-Absorbing Resin" and "Polyacrylic Acid (Salt)-Based Water-Absorbing Resin"

A "water-absorbing resin" according to the present specification means a water-swellable, water-insoluble polymer gelling agent. Furthermore, "water-swellable" means that the CRC (fluid retention capacity without pressure) as defined in ERT441.2-02 is 5 g/g or more, and "water-insoluble" means that the Extr (water soluble component) as defined in ERT470.2-02 is 0% to 50% by mass.

Furthermore, examples of the shape of the water-absorbing resin include a sheet form, a fibrous form, a film form, and a gel form; however, preferably a powdery water-absorbing resin, particularly preferably a powdery water-absorbing resin having the particle size or moisture content that will be described below, is desirable. In the present specification, a powdery water-absorbing resin is also particularly referred to as "water-absorbing resin powder". Meanwhile, the "particulate water-absorbing agent" described above also belongs to the class of "water-absorbing resin powder"; however, the final product obtainable by the present invention is referred to as "particulate water-absorbing agent" in particular. Furthermore, this may also be simply referred to as "water-absorbing agent", with the term "particulate" being omitted.

The "polyacrylic acid (salt)-based water-absorbing resin" according to the present specification means a crosslinked polymer which optionally contains a graft component and contains, as a repeating unit, acrylic acid and/or a salt thereof (hereinafter, referred to as acrylic acid (salt)) as a main component.

Specifically, the polyacrylic acid (salt)-based water-absorbing resin refers to a crosslinked polymer containing acrylic acid (salt) in an amount of 50 mol % to 100 mol % of among the total amount of monomers used for polymerization (excluding a crosslinking agent), and refers to a crosslinked polymer containing acrylic acid (salt) in an amount of preferably 70 mol % to 100 mol %, more preferably 90 mol % to 100 mol %, and particularly preferably substantially 100 mol %. Furthermore, in the present invention, a polyacrylic acid salt type (neutralized type) crosslinked polymer is also collectively referred to as polyacrylic acid (salt)-based water-absorbing resin.

(1-4) "EDANA" and "ERT"

The term "EDANA" is the abbreviation for the European Disposables and Nonwovens Associations, and the term "ERT" is the abbreviation for EDANA Recommended Test Methods, which are methods for analyzing a water-absorbing resin under the European standards (almost international standards). According to the present invention, unless particularly stated otherwise, physical properties of a water-absorbing resin are measured according to the original document of ERT (published document: revised in 2002).

(a) "CRC" (ERT441.2-02)

The term "CRC" is the abbreviation for Centrifuge Retention Capacity, and means the fluid retention capacity without pressure (hereinafter, also referred to as "fluid retention capacity"). Specifically, the CRC refers to the fluid retention capacity (unit: g/g) obtainable after 0.200 g of a water-absorbing resin is placed in a non-woven fabric bag and is immersed in a large excess of 0.9 mass % of aqueous sodium chloride solution (physiological saline) for 30 minutes to freely swell, and then the water-absorbing resin is dehydrated in a centrifuge (2500).

(b) "AAP" (ERT442.2-02)

The term "AAP" is the abbreviation for the Absorption Against Pressure, and means the fluid retention capacity under pressure. Specifically, the AAP refers to the fluid retention capacity (unit: g/g) obtainable after 0.900 g of a water-absorbing resin is caused to swell in a large excess of 0.9 mass % of aqueous sodium chloride solution (physiological saline) for 1 hour under a load of 2.06 kPa (0.3 psi).

(c) "PSD" (ERT420.2-02)

The term "PSD" is the abbreviation for the Particle Size Distribution, and means the particle size distribution that is measured by sieve classification. Furthermore, the mass average particle size (D50) and the logarithmic standard deviation (σζ) of the particle size distribution are measured by methods similar to "(3) Mass-Average Particle Diameter (D50) and Logarithmic Standard Deviation (σζ) of Particle Diameter Distribution" described in U.S. Pat. No. 7,638,579.

(1-5) Others

According to the present specification, the expression "X to Y" representing a range means "equal to or more than X and equal to or less than Y". Furthermore, unless particularly stated otherwise, a unit of weight, "t (ton)", means "metric ton", and "ppm" means "ppm by weight" or "ppm by mass". Furthermore, "weight" and "mass", "parts by weight" and "parts by mass", and "percent (%) by weight" and "percent (%) by mass" are respectively regarded as synonyms. Furthermore, " . . . acid (salt)" means " . . . acid and/or a salt thereof", and "(meth)acryl" means "acryl and/or methacryl".

(2) Method for Producing Particulate Water-Absorbing Agent (2-1) Step for Preparing an Aqueous Acrylic Acid (Salt)-Based Monomer Solution According to the present specification, an "aqueous acrylic acid (salt)-based monomer solution" refers to an aqueous solution of monomers including acrylic acid (salt) as a main component, which is an aqueous solution having incorporated therein as necessary, components that constitute a particulate water-absorbing agent, such as a crosslinking agent, a graft component, and trace components (a chelating agent, a surfactant, a dispersant, and the like), and is mixed with a polymerization initiator in that state and submitted to polymerization.

The above-mentioned acrylic acid (salt) may be unneutralized, or may be in a salt form (completely neutralized form or partially neutralized form), and the aqueous monomer solution may have a concentration exceeding the saturation concentration. An over-saturated aqueous solution or an aqueous slurry solution (aqueous dispersion liquid) of acrylic acid (salt) is also regarded as the aqueous acrylic acid (salt)-based monomer solution of the present invention. From the viewpoint of the physical properties of the resulting particulate water-absorbing agent, it is preferable to use an aqueous acrylic acid (salt)-based monomer solution having a concentration less than or equal to the saturation concentration.

Furthermore, a solvent for monomers is preferably water, and the acrylic acid (salt)-based monomer may be handled as an aqueous solution. Here, regarding the "aqueous solution", 100% by mass of the solvent is not limited to water; a water-soluble organic solvent (for example, alcohols and the like) of 0% to 30% by mass, or preferably 0% to 5% by mass may also be used in combination. In the present invention, these are regarded as aqueous solutions.

(Monomers)

An acrylic acid (salt)-based monomer according to the present invention is not particularly limited as long as the monomer forms a water-absorbing resin when polymerized, and examples thereof include anionic unsaturated monomers (salts) such as (meth)acrylic acid, maleic acid (anhydride), itaconic acid, cinnamic acid, vinylsulfonic acid, allyl toluenesulfonic acid, vinyl toluenesulfonic acid, styrenesulfonic acid, 2-(meth)acrylamido-2-methylpropanesulfonic acid, 2-(meth)acryloylethanesulfonic acid, 2-(meth)acryloylpropanesulfonic acid, and 2-hydroxyethyl (meth)acryloyl phosphate; mercapto group-containing unsaturated monomers; phenolic hydroxyl group-containing unsaturated monomers; amide group-containing unsaturated monomers such as (meth)acrylamide, N-ethyl (meth)acrylamide, and N,N-dimethyl (meth)acrylamide; and amino group-containing unsaturated monomers such as N,N-dimethylaminoethyl (meth)acrylate, N,N-dimethylaminopropyl (meth)acrylate and N,N-dimethylaminopropyl (meth)acrylamide.

An amount of the acrylic acid (salt)-based monomer included (used) is usually 50 mol % or more, preferably 70 mol % or more, more preferably 80 mol % or more, even more preferably 90 mol % or more, and particularly preferably 95 mol % or more (the upper limit is 100 mol %) per the total amount of monomers (excluding an internal crosslinking agent). Furthermore, polyacrylic acid (salt) according to the present invention is a concept which is not limited to an unneutralized compound (rate of neutralization 0 mol %), but includes partially neutralized compounds or completely neutralized compound (rate of neutralization 100 mol %).

According to the present invention, the rate of neutralization of the acrylic acid (salt)-based monomer or crosslinked hydrogel polymer after polymerization is not particularly limited; however, from the viewpoints of physical properties of the particulate water-absorbing agent thus obtainable or reactivity of the surface crosslinking agent, the rate of neutralization is preferably 40 mol % to 90 mol %, more preferably 50 mol % to 80 mol %, and even more preferably 60 mol % to 74 mol %.

However, in a case where the rate of neutralization is low, the water absorption speed (for example, FSR (Free Swell Rate)) tends to decrease. In contrast, in a case where the rate of neutralization is high, the reactivity between a water-absorbing resin powder and a surface crosslinking agent, particularly a surface crosslinking agent having the dehydration reactivity described below (for example, an alkylene carbonate) is decreased, and productivity tends to decrease, or liquid permeability (for example, SFC (Saline Flow Conductivity)) or the fluid retention capacity under pressure (for example, AAP or PUP (Performance Under Pressure)) tends to decrease. Therefore, a rate of neutralization within the range described above is preferred. Furthermore, in applications where there is a possibility that the water-absorbing resin may directly be in contact with the human body, such as a disposable diaper, neutralization after polymerization is not needed.

Furthermore, from the viewpoint of the fluid retention capacity without pressure (CRC) or the fluid retention capacity under pressure (AAP) of the particulate water-absorbing agent obtained as a final product, the acrylic acid (salt)-based monomer or crosslinked hydrogel polymer may be partially or entirely in the form of salt. Monovalent salts such as alkali metal salts such as a sodium salt, a lithium salt or a potassium salt; ammonium salts; and amines are preferred, and among them, alkali metal salts are more preferred, a sodium salt and/or a potassium salt is even more preferred, and from the viewpoint of cost or physical properties, a sodium salt is particularly preferred.

(Polymerization Inhibitor)

The acrylic acid (salt)-based monomer of the present invention may include a polymerization inhibitor. The polymerization inhibitor is not particularly limited; however, examples thereof include the N-oxyl compounds, manganese compounds, and substituted phenolic compounds disclosed in WO 2008/096713 A. Among them, substituted phenols are preferred, and methoxyphenols are particularly preferred.

Examples of the methoxyphenols include o-, m- and p-methoxyphenols, and methoxyphenolic compounds having one or two or more substituents such as a methyl group, a t-butyl group and a hydroxyl group. According to the present invention, p-methoxyphenol is particularly preferred.

Furthermore, the content of the polymerization inhibitor in the acrylic acid (salt)-based monomer is preferably 5 to 200 ppm, and in the following order, 5 to 160 ppm, 10 to 160 ppm, 10 to 100 ppm, or to 80 ppm is preferred, while 10 to 70 ppm is most preferred. When the content is 200 ppm or less, it is preferable because color deterioration (coloration called yellowish tint or yellowing) of the resulting particulate water-absorbing agent is suppressed. Furthermore, in a case where the content is less than 5 ppm, that is, in a case where the polymerization inhibitor is eliminated through purification such as distillation, there is an increased risk of causing unintended polymerization; however, since such a risk can be avoided by adjusting the content to 5 ppm or more, it is preferable.

(Internal Crosslinking Agent)

In the present invention, upon the polymerization, an internal crosslinking agent is used as necessary. Regarding the internal crosslinking agent, any known agent can be used, and examples thereof include N,N'-methylenebis(meth)acrylamide, (poly)ethylene glycol di(meth)acrylate, (poly)propylene glycol di(meth)acrylate, trimethylolpropane tri(meth)acrylate, glycerin tri(meth)acrylate, glycerin acrylate methacrylate, ethylene oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkane, (poly)ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine, and glycidyl (meth)acrylate. Among these, one kind or two or more kinds thereof can be used in consideration of reactivity, and among them, it is preferable to use a compound having two or more polymerizable unsaturated groups.

Furthermore, when two or more kinds of internal crosslinking agents are used in combination, since the internal crosslinked structure can be changed by changing the reactivity of the functional groups, it is preferable to select and use in combination an internal crosslinking agent having a functional group that is different from those of the exemplary compounds described above, such as an amide compound, a (meth)acrylate compound, an allyl compound, an amine compound, an imine compound, an alcohol compound, a carbonate compound, and a glycidyl compound.

The amount to use the internal crosslinking agent can be appropriately determined according to the desired physical properties of the particulate water-absorbing agent; however, the amount to use is preferably 0.001 mol % to 5 mol %, more preferably 0.005 mol % to 2 mol %, and even more preferably 0.01 mol % to 1 mol % per the total amount of the acrylic acid (salt)-based monomer. Furthermore, in a case where two or more kinds of internal crosslinking agents are used in combination, the sum of an amount of each internal crosslinking agent used is preferably 0.001 mol % to 5 mol %, more preferably 0.005 mol % to 2 mol %, and even more preferably 0.01 mol % to 1 mol % per the total amount of the acrylic acid (salt)-based monomer.

In a case where the amount to use (if two or more kinds are used in combination, then a total amount to use) is 0.001 mol % or more, the water soluble component of the obtained particulate water-absorbing agent is small, and a sufficient amount of water absorption under pressure can be secured. Further, in a case where the foregoing amount to use is 5 mol % or less, the crosslink density of the resulting particulate water-absorbing agent will not become too high, thereby maintaining a sufficient amount of water absorption. The entire amount of the internal crosslink agent may be added to the prepared aqueous acrylic acid (salt)-based monomer solution before the polymerization step, or a portion of the entire amount may be added after the initiation of polymerization.

(Chain Transfer Agent)

In the present invention, upon the polymerization, a chain transfer agent is used as necessary. When polymerization is carried out in the presence of a chain transfer agent in addition to the internal crosslinking agent and the polymerization initiator, a particulate water-absorbing agent having high water absorption performance and having excellent stability against urine is obtained. Furthermore, when a chain transfer agent is used in combination, the amount to use the internal crosslinking agent can be increased, and as a result of an increase in the crosslink density, the resistance to urine-induced deterioration can be enhanced.

The chain transfer agent is not particularly limited as long as the agent is soluble in the aqueous monomer solution, and examples thereof include thiols, thiol acids, secondary alcohols, amines, phosphorous acid salts, and hypophosphorous acid salts. Specific examples include mercaptoethanol, mercaptopropanol, dodecyl mercaptan, thioglycols, thiomalic acid, 3-mercaptopropionic acid, isopropanol, sodium phosphite, potassium phosphite, sodium hypophosphite, formic acid, and salts thereof. Among these, one kind or two or more kinds can be used. Meanwhile, from the viewpoint of effects, a phosphorus-based compound is preferably used, and a hypophosphorous acid salt such as sodium hypophosphite is more preferably used.

The amount to use the chain transfer agent can be appropriately determined according to the desired physical properties of the particulate water-absorbing agent; however, the amount to use is preferably 0.001 mol % to 1 mol %, and more preferably 0.005 mol % to 0.3 mol % per the total amount of the acrylic acid (salt)-based monomer. In a case where the amount to use is 0.001 mol % or more, since the amount of the internal crosslinking agent does not become relatively larger, the crosslink density consequently does not become too high, and the fluid retention capacity can be prevented from decreasing. On the other hand, in a case where the amount to use is 1 mol % or less, increase of the water soluble component is suppressed, and gel stability can be maintained. Meanwhile, the chain transfer agent may be added in the entire amount to the aqueous acrylic acid (salt)-based monomer solution after the preparation before the polymerization step, or a portion or the whole amount may be added after the initiation of polymerization.

(2-2) Aqueous Solution Polymerization Step (Polymerization Method)

Regarding the polymerization method for obtaining the particulate water-absorbing agent related to the present invention, examples include spray polymerization, droplet polymerization, bulk polymerization, precipitation polymerization, aqueous solution polymerization, and reverse phase suspension polymerization. According to the present invention, aqueous solution polymerization in which the monomers are used in the form of an aqueous solution is preferred.

The aqueous solution polymerization is a method of polymerizing an aqueous monomer solution without using a dispersing solvent, and this method is disclosed in, for example, U.S. Pat. Nos. 4,625,001, 4,873,299, 4,286,082, 4,973,632, 4,985,518, 5,124,416, 5,250,640, 5,264,495, 5,145,906, 5,380,808, EP 0,811,636, EP 0,955,086, and EP 0,922,717.

The concentration of the aqueous monomer solution at the time of polymerization is not particularly limited; however, the concentration is preferably 20% by mass to the saturation concentration or less, more preferably 25% to 80% by mass, and even more preferably 30% to 70% by mass. In a case where the concentration is 20% by mass or more, productivity can be enhanced, and therefore, it is preferable. Furthermore, since polymerization of monomers into a slurry (aqueous dispersion liquid of an acrylic acid salt) may be subjected to deterioration of physical properties, it is preferable to perform polymerization at a concentration less than or equal to the saturation concentration (see: JP 1-318021 A).

Furthermore, in order to accelerate polymerization and enhance physical properties, a step for degassing dissolved oxygen (for example, a step for purging with an inert gas) may be provided as necessary at the time of polymerization. In addition to that, for the purpose of increasing the water absorption speed, increasing the surface area, or increasing the rate of drying, gas bubbles (particularly of an inert gas) or various foaming agents (for example, organic or inorganic carbonates, azo compounds, and urea compounds) are incorporated at the time of polymerization, and the polymer may be caused to foam at the time of polymerization or at the time of drying, for example, such that the volume becomes 1.001 times to 10 times.

The polymerization step according to the present invention may be carried out under the conditions of any one of normal pressure, reduced pressure, and added pressure; however, the polymerization step is preferably carried out at normal pressure (or close to normal pressure, usually ±10 mmHg). Furthermore, the temperature at the time of initiation of polymerization may vary depending on the kind of the polymerization initiator used; however, the temperature is preferably 15° C. to 130° C., and more preferably 20° C. to 120° C.

(Polymerization Initiator)

The polymerization initiator used for the present invention is appropriately determined according to the mode of polymerization and is not particularly limited, and examples thereof include a photodegradation type polymerization initiator, a thermal degradation type polymerization initiator, and a redox-based polymerization initiator. Polymerization of the present invention is initiated by these polymerization initiators.

Examples of the photodegradation type polymerization initiator include a benzoin derivative, a benzyl derivative, an acetophenone derivative, a benzophenone derivative, and an azo compound.

Examples of the thermal degradation type polymerization initiator include persulfuric acid salts such as sodium persulfate, potassium persulfate, and ammonium persulfate; peroxides such as hydrogen peroxide, t-butyl peroxide, and methyl ethyl ketone peroxide; and azo compounds such as 2,2'-azobis(2-amidinopropane) dihydrochloride and 2,2'-azobis[2-(2-imidazolin-2-yl)propane]dihydrochloride.

Furthermore, examples of the redox-based polymerization initiator include a system of using a reducing compound such as L-ascorbic acid or sodium hydrogen sulfite in combination with a persulfuric acid salt or a peroxide as described above.

Furthermore, it is also a preferred embodiment to use a photodegradation type polymerization initiator and a thermal degradation polymerization type polymerization initiator in combination. Furthermore, active energy radiation such as ultraviolet radiation, an electron beam, or γ-radiation may be used singly, or may be used in combination with the polymerization initiators described above.

The amount to use the polymerization initiator is preferably 0.0001 mol % to 1 mol %, and more preferably 0.0005 mol % to 0.5 mol % per the monomers. In a case where the amount to use the polymerization initiator is 1 mol % or less, it is preferable because color deterioration of the particulate water-absorbing agent is suppressed. Furthermore, in a case where the amount to use is 0.0001 mol % or more, it is preferable because the amount of residual monomers can be reduced.

(More Suitable Polymerization Method)

According to the present invention, regarding the polymerization method for the aqueous acrylic acid (salt)-based monomer solution, at least one of reverse phase suspension polymerization, spray polymerization, droplet polymerization, and aqueous solution polymerization, particularly aqueous solution polymerization, is employed from the viewpoints of the physical properties (for example, water absorption speed and liquid permeability) of the particulate water-absorbing agent, or the ease of control of polymerization.

Examples of a preferred embodiment of the aqueous solution polymerization include high temperature-initiated aqueous solution polymerization in which the polymerization initiation temperature is set to preferably 40° C. or higher, more preferably 50° C. or higher, even more preferably 60° C. or higher, particularly preferably 70° C. or higher, and most preferably to 80° C. or higher (the upper limit is the boiling point); high concentration aqueous solution polymerization in which the monomer concentration is set to preferably 40% by mass or more, more preferably 45% by mass or more, and even more preferably 50% by mass or more (the upper limit is 90% by mass or less, preferably 80% by mass or less, and more preferably 70% by mass or less); and high concentration/high temperature-initiated aqueous solution polymerization combining the foregoing modes.

From the viewpoint of enhancing the resistance to urine-induced deterioration of the particulate water-absorbing agent of the present invention, so-called acid polymerization and succeeding neutralization, in which polymerization is performed using unneutralized acrylic acid as a main component, and acid groups are polymerized after the polymerization, may also be employed.

(2-3) Gel-Crushing Step

This is an optional step for gel-crushing the crosslinked hydrogel polymer (hereinafter, also referred to as "hydrogel") obtained through the aforementioned step of polymerization (particularly, aqueous solution polymerization) and the like so as to obtain a hydrogel in the form of particles (hereinafter, also referred to as "particulate hydrogel").

The gel-crushing machine that can be used for the present invention is not particularly limited; however, examples thereof include a gel-crushing machine equipped with plural rotary stirring blades, such as a batch type or continuous type double-arm type kneader; a single-screw extruder, a twin-screw extruder, and a meat chopper. Among them, a screw type extruder having a perforated plate at the tip is preferred, and for example, the screw type extruder disclosed in JP 2000-063527 A may be used.

According to the present invention, the polymerization step and the gel-crushing step may also be carried out by any of a kneader polymerization method in which the crosslinked hydrogel polymer is gel crushed at the time of polymerization, and a method of subjecting a crosslinked hydrogel polymer obtained by continuous belt polymerization to the gel-crushing step.

(2-4) Drying Step

The drying method according to the present invention is not particularly limited, and various methods can be employed. Specific examples include heated drying, hot air drying, drying under reduced pressure, infrared drying, microwave drying, drying by azeotropic dehydration using a hydrophobic organic solvent, and high humidity drying using high temperature steam, and these may be used singly or in combination of two or more kinds. The drying temperature is preferably 100° C. to 300° C., and more preferably 150° C. to 250° C.

Furthermore, the drying time may vary depending on the surface area or moisture content of the hydrogel, the kind of the drying machine, or the like; however, for example, the drying time is preferably 1 minute to 5 hours, and more preferably 5 minutes to 1 hour. The solids content of the resin that is determined from an amount lost from drying (1 g of a powder or particles is dried for 3 hours at 180° C.) is preferably 80% by mass or more, more preferably 85% to 99% by mass, and even more preferably 90% to 98% by mass.

(2-5) Crushing/Classification Step

This is a step for subjecting the dry polymer obtained in the drying step to crushing and/or classification, and thereby obtaining a water-absorbing resin powder preferably having a particular particle size. The (2-3) gel-crushing step is different from this step from the viewpoint that the object of crushing is subjected to a drying step. The water-absorbing resin after the crushing step may also be referred to as crushing product.

(Particle Size Distribution)

The mass average particle size (D50) of the water-absorbing resin powder supplied to the surface crosslinking step, which is a subsequent step, is preferably in the range of 200 to 600 µm, more preferably in the range of 200 to 550 µm, even more preferably in the range of 250 to 500 µm, and particularly preferably in the range of 300 to 450 µm, from the viewpoints of the water absorption speed, liquid permeability, fluid retention capacity under pressure, and the like.

Furthermore, it is more desirable if fine particles having a particle size of less than 150 µm as defined by standard sieve classification are smaller. From the viewpoint of liquid permeability or the like, the content of the fine particles is preferably 0% to 5% by mass, more preferably 0% to 3% by mass, and even more preferably 0% to 1% by mass. Furthermore, it is also more desirable if coarse particles having a particle size of 710 µm or more (preferably, 850 µm or more) as defined by standard sieve classification are smaller. From the viewpoint of the water absorption speed, the content of the coarse particles is preferably 0% to 5% by mass, more preferably 0% to 3% by mass, and even more preferably 0% to 1% by mass.

Furthermore, regarding the distribution range of the particle size, with respect to the range of preferably 150 µm or more and less than 850 µm, and more preferably 150 µm or more and less than 710 µm, it is preferable that the particles having the particle size are included at a proportion of 95% by mass or more, more preferably at a proportion of 98% by mass or more, and even more preferably at a proportion of 99% by mass or more (the upper limit is 100% by mass), from the viewpoints of the water absorption speed, liquid permeability, fluid retention capacity under pressure, and the like.

The control of the particle size can be implemented through the polymerization step, the gel-crushing step, or the crushing/classification step of the drying step; however, it is particularly preferable to implement the control through the classification step after drying. Furthermore, measurement of the particle size is carried out according to the method defined in WO 2004/69915 A or EDANA-ERT420.2-02 using JIS standard sieves (Z8801-1 (2000)).

Furthermore, the shape of the water-absorbing resin powder of the present invention may be a spherical shape or an aggregate thereof, or may be an irregularly crushed shape obtained by subjecting a hydrogel or a dry polymer to a crushing step. However, from the viewpoint of the water absorption speed, an irregularly crushed shape or a granulation product thereof is preferred.

According to the present invention, the particle size is applied preferably after the surface crosslinking step, and more preferably also to the particulate water-absorbing agent as a final manufactured product. When the water-absorbing resin powder after surface crosslinking or the particulate water-absorbing agent as a final manufactured product has the particle size described above, the effects of the present invention can be exhibited more effectively.

(2-6) Fine Powder Recycling Step

After the drying step, a classification step (including a second classification step after the surface crosslinking step; hereinafter, the same) is included, and it is preferable that water-absorbing resin fine particles, which constitute a sieve fraction of a standard sieve having a mesh size of 150 µm, are separated in the classification step described above, and then the water-absorbing resin fine particles or a hydrogenation product thereof is collected (recycled) in a step preceding the drying step. Coarse particles that are removed in the classification step may be re-crushed as necessary, and the fine particles that are removed in the classification step may be discarded, may be used for other applications, or may be supplied to the present fine powder recycling step.

The fine powder to be collected may be a fine powder before the surface crosslinking step, or may be a fine powder after the surface crosslinking step. The amount of the fine powder to be collected is preferably 1% to 40% by mass, and more preferably 5% to 30% by mass, of the dry polymer.

(2-7) Surface Crosslinking Agent Adding Step

This is a step for producing a water-absorbing resin powder containing a surface crosslinking agent, which is to be supplied to the surface crosslinking step. In general, surface crosslinking is carried out by addition of an organic surface crosslinking agent that will be described below, by polymerization of monomer molecules at the surface of the water-absorbing resin powder, or by addition of a radical polymerization initiator such as a persulfuric acid salt, and heating/ultraviolet irradiation, or the like. According to the present invention, it is preferable to add an organic surface crosslinking agent to the water-absorbing resin powder obtainable in the classification step, more preferably to a water-absorbing resin powder including the water-absorbing resin powder obtained through the fine powder recycling step. The liquid permeation enhancer adding step that will be described below may also be carried out simultaneously.

(Organic Surface Crosslinking Agent)

The organic surface crosslinking agent that can be used for the present invention is preferably an organic compound having a reactive group such as a hydroxyl group and/or an amino group, which undergoes a dehydration esterification reaction or dehydration amidation reaction with a carboxyl group, which is a functional group of the polyacrylic acid (salt)-based water-absorbing resin powder, from the viewpoint of the physical properties of the resulting particulate water-absorbing agent. The organic compound is not limited to an alcohol compound or an amine compound, which has a hydroxyl group or an amino group per se, and a cyclic compound such as an alkylene carbonate compound or an oxazolidinone compound, and compounds having a reactive group that produces a hydroxyl group or an amino group, and/or a reactive group that reacts directly with the carboxyl group, are also included.

Examples of the organic surface crosslinking agent include a polyhydric alcohol compound, an epoxy compound, an oxazoline compound, a (mono-, di-, or poly-) oxazolidinone compound, an oxetane compound, and an alkylene carbonate compound, and a polyhydric alcohol compound, an alkylene carbonate compound, and an oxazolidinone compound are more preferred.

Furthermore, it is preferable to use two or more kinds of compounds selected from a polyhydric alcohol compound, an epoxy compound, an oxazoline compound, and an alkylene carbonate compound in combination. From the viewpoint of further enhancing the physical properties, a combination of a polyhydric alcohol and one of the organic surface crosslinking agent described above, other than a polyhydric alcohol, is preferred; a combination of a polyhydric alcohol and an epoxy compound or an alkylene carbonate compound is more preferred; and a combination of a polyhydric alcohol and an alkylene carbonate compound is even more preferred.

In a case where the plural organic surface crosslinking agents are combined, particularly in regard to the combination of a polyhydric alcohol and one of the organic surface crosslinking agents, other than a polyhydric alcohol, the ratio (mass ratio) of polyhydric alcohol:compound other than a polyhydric alcohol is preferably 1:100 to 100:1, more preferably 1:50 to 50:1, and even more preferably 1:30 to 30:1.

The temperature of the solvent in which these components are mixed is appropriately determined; however, if the temperature is too low, solubility or viscosity may become too low. Therefore, particularly in a case where the solid non-polymeric organic compound that will be described below (particularly ethylene carbonate) is used as a surface crosslinking agent, water that has been heated to a temperature higher than or equal to room temperature (25° C.; hereinafter, the same) (30° C. to 100° C. is preferred, 35° C. to 70° C. is more preferred, and 40° C. to 65° C. is even more preferred) is used as a solvent.

That is, it is preferable that the other compound (particularly water) that is mixed with the non-polymeric organic compound (particularly a solid surface crosslinking agent (a solid polyhydric alcohol or a cyclic compound such as an alkylene carbonate)) is heated to a temperature higher than or equal to room temperature, and it is more preferable that the other compound is in the temperature range described above.

Furthermore, it is preferable that an alkylene carbonate compound (particularly, a solid alkylene carbonate compound) or the polyhydric alcohol is heated in advance before being mixed with water. Regarding the heating temperature, it is preferable to heat the compound to a temperature higher than the temperature of the aqueous solution of a surface crosslinking agent after hydrogenation. Specifically, it is preferable that the solid alkylene carbonate compound and/or solid polyhydric alcohol is heated and melted, and the temperature is preferably 30° C. to 100° C., more preferably 35° C. to 70° C., and even more preferably 40° C. to 65° C.

Specific examples of the organic surface crosslinking agent include polyhydric alcohol compounds such as ethylene glycol, propylene glycol, 1,3-propanediol, glycerin, 2-butene-1,4-diol, 1,4-butanediol, 1,3-butanediol, 1,5-pentanediol, 1,6-hexanediol, trimethylolpropane, di- or triethanolamine, pentaerythritol, and sorbitol; epoxy compounds such as ethylene glycol diglycidyl ether, glycerol polyglycidyl ether, and glycidol; oxazoline compounds such as 2-oxazolidone, N-hydroxyethyl-2-oxazolidone, and 1,2-ethylene bisoxazoline; alkylene carbonate compounds such as 1,3-dioxolan-2-one, 4-methyl-1,3-dioxolan-2-one, 4,5-dimethy-1,3-dioxolan-2-one, 4,4-dimethyl-1,3-dioxolan-2-one, 4-ethyl-1,3-dioxolan-2-one, 4-hydroxymethyl-1,3-dioxolan-2-one, and 4,6-dimethyl-1,3-dioxan-2-one; and oxetane compounds such as 3-methyl-3-oxetanemethanol and 3-ethyl-3-oxetanemethanol.

(Solvent and Concentration)

The amount of the organic surface crosslinking agent to add is, in its total amount, preferably 0.001 parts to 15 parts by mass, and more preferably 0.01 parts to 5 parts by mass, per 100 parts by mass of the water-absorbing resin before addition.

Furthermore, in a case where two kinds of organic surface crosslinking agents, such as a polyhydric alcohol compound and a compound other than a polyhydric alcohol, are used, the total amount of the polyhydric alcohol compound is preferably 0.001 parts to 10 parts by mass, and more preferably 0.01 parts to 5 parts by mass, and the total amount of the compound other than a polyhydric alcohol compound is preferably 0.001 parts to 10 parts by mass, and more preferably 0.01 parts to 5 parts by mass, both per 100 parts by mass of the water-absorbing resin before addition.

It is preferable that the organic surface crosslinking agent is added as an aqueous solution. The amount of water used in the aqueous solution is preferably 0.5 parts to 20 parts by mass, and more preferably 0.5 parts to 10 parts by mass per 100 parts by mass of the water-absorbing resin before the addition treatment. The crystallization water and hydrated water and the like of the surface crosslinking agent are also included in this amount of water.

Furthermore, a hydrophilic organic solvent may be added to the aqueous solution of an organic surface crosslinking agent, and the amount of the hydrophilic organic solvent is preferably more than 0 parts by mass and 10 parts by mass or less, and more preferably more than 0 parts by mass and 5 parts by mass or less per 100 parts by mass of the water-absorbing resin before the addition treatment. Preferred examples of the hydrophilic organic solvent include a primary alcohol having 1 to 4 carbon atoms, furthermore 2 to 3 carbon atoms; a lower ketone having 4 or fewer carbon atoms, such as acetone; an ether; an amide; a sulfoxide; and a polyhydric alcohol. Particularly, a volatile alcohol having a boiling point below 150 C, and more preferably below 100 C, or the like is more preferred, because the solvent is volatilized at the time of the surface crosslinking treatment and does not remain.

Specific examples include lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and methoxy (poly)ethylene glycol; amides such as ε-caprolactam and N,N-dimethylformamide; sulfoxides such as dimethyl sulfoxide; and polyhydric alcohols such as polyoxypropylene and an oxyethylene-oxypropylene block copolymer.

Furthermore, on the occasion of mixing of a surface crosslinking agent solution into the water-absorbing resin powder, a surfactant may also be incorporated in an amount of more than 0 parts by mass and 10 parts by mass or less, preferably more than 0 parts by mass and 5 parts by mass or less, and even more preferably more than 0 parts by mass and 1 part by mass or less per 100 parts by mass of the water-absorbing resin before the addition treatment, to the extent that the effects of the present invention are not impaired. At this time, the surfactants that may be used are disclosed in U.S. Pat. No. 7,473,739 and the like.

The concentration of the surface crosslinking agent in the aqueous solution of a surface crosslinking agent is appropriately determined; however, the aqueous solution is adjusted to have a surface crosslinking agent concentration of 1% to 80% by mass, furthermore 5% to 60% by mass, 10% to 40% by mass, or 15% to 30% by mass, from the viewpoints of physical properties. The balance includes the hydrophilic organic solvent and other components.

The temperature of the aqueous solution of an organic surface crosslinking agent is appropriately determined from the solubility of the organic surface crosslinking agent used, the viscosity of the aqueous solution or the like, and the temperature is preferably −10 C to 100 C, more preferably 5 C to 70 C, even more preferably 10 C to 65 C, and particularly preferably in the range of 25 C to 50 C. When the temperature is lower than or equal to the upper limit of temperature described above, deterioration of miscibility, such as a cyclic compound being hydrolyzed (for example, decomposition of ethylene carbonate into ethylene glycol, or decomposition of oxazolidinone into ethanolamine), or water or the hydrophilic organic solvent being volatilized, before the aqueous solution of an organic surface crosslinking agent is mixed or reacted with the water-absorbing resin powder, can be prevented. Furthermore, when the temperature is higher than or equal to the lower limit of temperature described above, the surface crosslinking agent solution can be prevented from being coagulated, or the surface crosslinking agent can be prevented from being precipitated.

(Combined Use of Acid or Base with Surface Crosslinking Agent Solution)

The surface crosslinking agent solution may also include an acid or a base, in addition to the organic surface crosslinking agent, the hydrophilic organic solvent, and the surfactant, in order to accelerate the reaction or uniform mixing of the surface crosslinking agent.

Examples of the acid or base include an organic acid or a salt thereof, an inorganic acid or a salt thereof, and an inorganic base. The acid or the base is appropriately used in an amount of 0 parts to parts by mass, more preferably 0.001 parts to 5 parts by mass, and even more preferably 0.01 parts to 3 parts by mass per 100 parts by mass of the water-absorbing resin before the addition treatment. The organic acid is preferably a water-soluble organic acid, more preferably a water-soluble saturated organic acid, and even more preferably a hydroxyl group-containing saturated organic acid, having 1 to 6 (more preferably 2 to 4) carbon atoms.

Other examples include non-crosslinkable water-soluble inorganic bases (preferably an alkali metal salt, an ammonium salt, an alkali metal hydroxide, and ammonia) or hydroxides thereof, and non-reducing alkali metal salt pH buffer agents (preferably a hydrogen carbonate, a dihydrogen phosphate, and a hydrogen phosphate).

(Method for Adding Organic Surface Crosslinking Agent Solution)

Through the addition treatment, the organic surface crosslinking agent is added to the water-absorbing resin powder. The method for the addition treatment is not particularly limited, and examples include a method of immersing the water-absorbing resin in a hydrophilic organic solvent, and adsorbing the crosslinking agent to be added to the resin; and a method of spraying or dropping the crosslinking agent solution to be added directly to the water-absorbing resin, and mixing the system. From the viewpoint of uniformly adding a predetermined amount, the latter method is preferred. Furthermore, in order to add the crosslinking agent solution uniformly, it is preferable to perform the addition treatment while stirring the water-absorbing resin, and it is more preferable to spray the organic surface crosslinking agent solution.

During the addition treatment, two or more kinds of surface crosslinking agents having different compositions may be added simultaneously using, for example, different spray nozzles; however, from the viewpoint of uniformity or the like, a single composition is preferred. Furthermore, if a single composition is used, plural spray nozzles may be used in consideration of the size or throughput of the addition treatment apparatus, and the spray angle of the spray nozzle.

Regarding the apparatus used for the addition treatment (hereinafter, may be referred to as a mixing apparatus), for example, a cylinder type mixer, a double-walled conical mixer, a V-shaped mixer, a ribbon type mixer, a screw-type mixer, a fluidized furnace, a rotary disk type mixer, a gas stream type mixer, a double-armed kneader, an internal mixer, a crushing kneader, a rotary mixer, a screw type extruder, a Turbulizer, and a plough share mixer are suitable. Furthermore, for large-scale production such as commercial production, an apparatus capable of continuous mixing is preferred. Furthermore, the respective addition treatments may be carried out using the same apparatus, or may be carried out using different apparatuses.

The water-absorbing resin powder supplied to the present step is preferably heated and kept warm, and the temperature is preferably in the range of 30 C to 100 C, more preferably 35 C to 80 C, and even more preferably 40 C to 70 C. When the temperature is higher than or equal to the lower limit of temperature described above, precipitation of the surface crosslinking agent or moisture absorption of the water-absorbing resin is suppressed, and the surface crosslinking treatment can be carried out uniformly or satisfactorily. Also, when the temperature is lower than or equal to the upper limit of temperature described above (particularly the boiling point of water or lower), the occurrence of precipitation of the surface crosslinking agent due to evaluation of water from the aqueous solution of the surface crosslinking agent can be prevented.

(2-8) Surface Crosslinking Step

This is a step for performing a heating treatment to subject the surface or the vicinity of the surface of the water-absorbing resin powder to a crosslinking treatment, in order to enhance the fluid retention capacity under pressure or liquid permeability of the particulate water-absorbing agent as a final manufactured product. The present step can be carried out simultaneously with the surface crosslinking agent adding step or after the surface crosslinking agent adding step, and it is preferable to carry out the present step after the surface crosslinking agent adding step. The present step may be carried out once, or may be carried out several times under the same conditions or under different conditions.

(Heating Apparatus)

An example of the heating apparatus used for the surface crosslinking step of the present invention may be a continuous or batch type heating apparatus in which a known drying machine or heating furnace is equipped with a gas discharge mechanism and/or a gas supply mechanism for adopting a predetermined atmosphere. Preferably, a continuous heating apparatus is suitable.

Regarding the heating system of the heating apparatus, systems of conductive heat transfer type, radiation heat transfer type, hot air heat transfer type, and dielectric heating type are suitable. Heating systems of conductive heat transfer type and/or hot air heat transfer type are more preferred, and a system of conductive heat transfer type is even more preferred.

The so-called control temperature for the heating apparatus may be any temperature at which the water-absorbing resin can be heated to the temperature that will be described below, and it is not necessary for the control temperature to be constant from the beginning to the end of the process. However, in order to prevent partial overheating or the like, the control temperature is preferably 50° C. to 300° C. In a case where damage resistance is regarded as important among the physical properties of the resulting particulate water-absorbing agent, the control temperature is more preferably 250° C. or lower, even more preferably 70° C. to 200° C., and particularly preferably 90° C. to 180° C. On the other hand, in a case where the water absorption performance is regarded as important, the control temperature is more preferably 120° C. to 280° C., even more preferably 150° C. to 250° C., and particularly preferably 170° C. to 230° C.

(2-9) Water-Insoluble Metal Phosphate Adding Step

The water-insoluble metal phosphate adding step is carried out after the drying step. More preferably, the present step is carried out after the crushing/classification step, and it is preferable to carry out the water-insoluble metal phosphate adding step as a preceding step and/or a succeeding step of the surface crosslinking step, while it is particularly preferable to carry out the step after the surface crosslinking step. The relevant step may be carried out several times, and in that case, the step is carried out after the drying step at least once. More preferably, the present step is carried out after the crushing/classification step, and it is preferable to carry out the step as a preceding step and/or a succeeding step of the surface crosslinking step, and it is particularly preferable to carry out the step after the surface crosslinking step.

Meanwhile, the water-absorbing resin powder after surface crosslinking is preferably controlled to have the physical properties described in (3-1) to (3-8) that will be described below, and when a water-insoluble metal phosphate is added to a water-absorbing resin powder having the relevant physical properties, a particulate water-absorbing agent imparted with fluidity at the time of moisture absorption (anti-caking properties) while maintaining the physical properties after surface crosslinking is obtained.

(Water-Insoluble Metal Phosphate)

The water-insoluble metal phosphate used for the present invention includes an anion of a phosphoric acid compound and a divalent or trivalent metal cation. Examples of the cation of a phosphoric acid compound include phosphate ion, pyrophosphate ion, tripolyphosphate ion, hexapolyphosphate ion, pentapolyphosphate ion, heptapolyphosphate ion, trimetaphosphate ion, tetrametaphosphate ion, hexametaphosphate ion, dihydrogen phosphate ion, and hydrogen phosphate ion. Examples of the divalent or trivalent metal cation include calcium ion, magnesium ion, strontium ion, barium ion, zinc ion, iron ion, aluminum ion, titanium ion, zirconium ion, hafnium ion, tin ion, cerium ion, scandium ion, yttrium ion, and lanthanum ion. Among them, calcium ion and aluminum ion are more preferred, and calcium ion is most preferred. Specific examples of calcium salt include monocalcium phosphate, calcium monohydrogen phosphate, dicalcium phosphate, tricalcium phosphate, hydroxyapatite, calcium pyrophosphate, and calcium dihydrogen pyrophosphate. These can be used singly or in combination of two or more kinds thereof; however, it is particularly preferable to use tricalcium phosphate alone. Meanwhile, the term "water-insoluble" means that the amount of dissolution in 100 g of water at 25° C. is less than 1 g.

It is essential for the water-insoluble metal phosphate used for the present invention that the upper limit of the crystallite size is less than 0.15 μm, and the crystallite size is preferably less than 0.13 μm, and more preferably less than 0.1 μm. In a case where the crystallite size is 0.15 μm or more, the moisture absorption blocking properties cannot be sufficiently reduced. On the other hand, the lower limit of the crystallite size is not particularly limited; however, from the viewpoint of workability at the time of the addition process, the crystallite size is preferably 0.005 μm or more, and more preferably 0.01 μm or more. Therefore, the upper limit and the lower limit of the crystallite size can be appropriately selected in the range described above, and for example, the crystallite size may be 0.005 μm or more and less than 0.15 μm, 0.01 μm or more and less than 0.15 μm, or 0.01 μm or more and less than 0.1 μm.

Meanwhile, the present invention is characterized in that the crystallite size of the water-insoluble metal phosphate included in the particulate water-absorbing agent as a final product satisfies the range described above; however, it is preferable that the crystallite size of the water-insoluble metal phosphate before being added to the water-absorbing resin powder also satisfies the range described above.

Furthermore, the method for controlling the crystallite size of the water-insoluble metal phosphate is not particularly limited, and known methods can be applied. Furthermore, a commercially available water-insoluble metal phosphate can also be used.

The crystallite size of the water-insoluble metal phosphate can be measured by XRD (X-ray diffraction analysis) described in the Examples.

Furthermore, in the water-insoluble metal phosphate used for the present invention, the upper limit of the average primary particle size is preferably less than 2.0 μm, more preferably less than 1.5 μm, and even more preferably less than 1.0 μm. When the average primary particle size is less than 2.0 jam, the moisture absorption blocking properties can be further reduced. On the other hand, the lower limit of the average primary particle size is not particularly limited; however, from the viewpoint of workability at the time of the addition process, the average primary particle size is preferably 0.005 μm or more, and more preferably 0.01 μm or more. Therefore, the upper limit and the lower limit of the average primary particle size can be appropriately selected within the range described above, and for example, the average primary particle size may be 0.005 μm or more and less than 2.0 μm, 0.01 μm or more and less than 1.5 μm, or 0.01 μm or more and less than 1.0 μm.

A preferred embodiment of the present invention is characterized in that the average primary particle size of the water-insoluble metal phosphate before being added to the water-absorbing resin powder satisfies the range described above.

The amount of the water-insoluble metal phosphate to add is, per 100 parts by mass of the water-absorbing resin powder, preferably 0.01 parts to 2 parts by mass, more preferably 0.01 parts to 1 part by mass, even more preferably 0.01 parts by mass or more and less than 1 part by mass, particularly preferably 0.05 parts to 0.7 parts by mass, and most preferably 0.08 parts to 0.6 parts by mass. When the amount to add is 0.01 parts by mass or more, sufficient moisture absorption blocking resistance performance is obtained, and when the amount to add is 2 parts by mass or less, sufficient water absorption performance can be maintained. Furthermore, if the amount to add is more than 2 parts by mass, sufficient moisture absorption blocking performance is obtained; however, since the operating cost increases proportionally to the increment of the amount to add, it is not preferable.

(Mixing Method)

The water-insoluble metal phosphate of the present invention may be added to the water-absorbing resin powder in the form of an aqueous slurry solution, or may be added in the form of a powder. However, it is preferable to dry mix the water-insoluble metal phosphate with the water-absorbing resin powder obtained in the drying step. This dry mixing means mixing in a state in which there is no liquid substance other than the liquid substance to be absorbed or retained by the water-insoluble metal phosphate and the water-absorbing resin powder supplied to the present step. Specifically, included is an embodiment in which the water-insoluble metal phosphate and a water-absorbing resin powder having a dry residual fraction, an absorbed moisture or water fraction, a surface crosslinking agent added in the surface crosslinking agent adding step, a solvent or the like, are mixed without further adding a liquid substance.

In order to sufficiently obtain the effects of the present invention, it is preferable that the water-insoluble metal phosphate is added to the water-absorbing resin powder, and then the mixture is thoroughly mixed. Specific mixing conditions may be appropriately determined in accordance with the apparatus used, the throughput, and the like. For example, a method of mixing with stirring using a Lödige mixer at a speed of rotation of 300 rpm for about from 30 seconds to 1 minute, or a method of mixing with stirring using a paddle type stirring apparatus at a speed of rotation of 60 rpm for from 20 minutes to 1 hour may be employed. Furthermore, a method of adding the water-absorbing resin powder while stirring the system is also acceptable.

Examples of the apparatus for mixing the water-absorbing resin and the water-insoluble metal phosphate include a cylinder type mixer, a screw type mixer, a screw type extruder, a Turbulizer, a Nauta type mixer, a V-shape mixer, a ribbon type mixer, a double-arm type kneader, a fluidized mixer, a gas stream type mixer, a rotary disk type mixer, a roll mixer, a vibration type mixer, and a Lödige mixer. Regarding the mixing method, a batch type method, a continuous type method, or a combined type method can all be employed. From the viewpoint of industrial production, continuous mixing is more preferred.

The mixing conditions are preferably to an extent that the water-absorbing resin powder is not subjected to damage. For example, the speed of rotation of the stirring unit of the mixing apparatus is preferably in the range of 1 to 3,000 rpm, more preferably 2 to 500 rpm, and even more preferably 5 to 300 rpm. When the speed of rotation is 3,000 rpm or lower, powdering of the water-absorbing resin powder does not easily occur, and deterioration of the water absorption characteristics can be prevented. Furthermore, when the speed of rotation is 1 rpm or higher, mixing can be achieved sufficiently, so that a satisfactory effect of reducing moisture absorption blocking properties (enhancement of moisture absorption fluidity) is obtained.

Furthermore, the temperature of the water-absorbing resin supplied to the present step is preferably room temperature to 200° C., more preferably 50° C. to 200° C., and even more preferably 50° C. to 100° C.

The mixing time is preferably 1 second to 20 minutes, more preferably 10 seconds to 10 minutes, and even more preferably 20 seconds to 5 minutes. When the mixing time is 20 minutes or less, powdering of the water-absorbing resin can be suppressed.

Therefore, regarding the mixing conditions for obtaining the particulate water-absorbing agent of the present invention, it is most preferable that the temperature of the water-absorbing resin powder is 50° C. to 100° C., the speed of rotation of the stirring unit is 5 to 300 rpm, and the mixing time is 20 seconds to 5 minutes. The mixed particulate water-absorbing agent obtained under the present conditions has excellent handleability and does not cause any problem such as adhesion or aggregation. Therefore, a further drying step may not be provided. When a predetermined amount of water (for example, the amount of water to add, as described above) is left in the particulate water-absorbing agent by appropriately drying the water-absorbing agent, a particulate water-absorbing agent having excellent impact resistance (abrasion resistance) with suppressed electrostatic charging can be produced.

(2-10) Step for Adding Other Additives

This is a step for adding additives other than the water-insoluble metal phosphate in order to impart various functions to the surface crosslinked water-absorbing resin, and the present step consists of one or plural processes. Examples of the additives include a cationic polymer compound, a water-soluble polyvalent metal cation-containing compound, a surfactant, a coloration inhibitor, a urine resistance enhancer, a dust removing agent, a deodorizer, a fragrance, an antibacterial agent, a foaming agent, a pigment, a dye, a fertilizer, an oxidizing agent, and a reducing agent.

The amount of the other additives is preferably less than 10 parts by mass, more preferably less than 5 parts by mass, and even more preferably less than 1 part by mass, per 100 parts by mass of the surface crosslinked water-absorbing resin powder. These additives may be carried out simultaneously with the surface crosslinking agent adding step, or in separate processes.

(Cationic Polymer Compound)

The cationic polymer compound is not particularly limited; however, the cationic polymer compounds exemplified in Patent Literatures 13 to 15 as well as in U.S. Pat. Nos. 5,382,610, 7,098,284 and the like can be suitably used. Among them, polyethyleneimine, polyvinylamine, polyallylamine, and a condensate of dimethylamine/ammonia/epichlorohydrin are preferred.

The molecular weight of the cationic polymer compound is preferably, as weight average molecular weight, 1,000 to 5,000,000, more preferably 2,000 to 1,000,000, and even more preferably 10,000 to 500,000.

The cationic polymer compound is preferably a water-soluble compound. Here, being water-soluble means that 1 g or more of the compound dissolves in 100 g of water at 25° C.

These cationic polymer compounds may be directly mixed into the water-absorbing resin, may be mixed in the state of a solution, particularly an aqueous solution, or may be dissolved in a surface crosslinking agent or an aqueous solution thereof and then mixed into the water-absorbing resin.

(Water-Soluble Polyvalent Metal Cation-Containing Compound)

The water-soluble polyvalent metal cation-containing compound means a water-soluble compound containing a divalent or higher-valent (preferably, trivalent or higher-valent) metal cation. Examples of the trivalent or higher-valent metal cation include aluminum ion, zirconium ion, and titanium ion, and aluminum ion is preferred. Examples of the water-soluble polyvalent metal cation-containing compound include polyvalent metal compounds, including inorganic salts of polyvalent metals, such as aluminum sulfate, aluminum chloride, zirconium oxychloride, zirconium ammonium carbonate, zirconium potassium carbonate, zirconium potassium carbonate, zirconium sulfate, zirconium acetate, and zirconium nitrate; and organic salts of polyvalent metals, such as aluminum acetate, aluminum lactate, zirconium hydroxychloride, titanium triethanol aminate, and titanium lactate. Among them, a compound containing aluminum ion as the polyvalent metal cation is preferred.

These water-soluble polyvalent metal cation-containing compounds may be directly mixed as powders into the water-absorbing resin, may be mixed in a state of a solution, particularly an aqueous solution, or may be dissolved in the surface crosslinking agent or an aqueous solution thereof and mixed into the water-absorbing resin.

The amount of the water-soluble polyvalent metal cation-containing compound to add is, in terms of the amount of the polyvalent metal cation, preferably 0.001 parts to 5 parts by mass, more preferably 0.01 parts to 2 parts by mass, and even more preferably 0.01 parts to 1 part by mass per 100 parts by mass of the water-absorbing resin to be added.

Furthermore, the number of additions is not particularly limited, and the addition may be carried out once or several times. In a case where the addition is carried out several times, for example, in a case where the addition is carried out two times, the ratio (mass ratio) of the amount of the first time to add/the amount of the second time to add is defined to be in the range of 1/99 to 99/1, and preferably 10/90 to 90/10. When the water-soluble polyvalent metal cation-containing compound is added in the range described above, it is preferable from the viewpoint that the water-soluble polyvalent metal cation-containing compound is caused to exist uniformly on the surface of the water-absorbing resin.

In a case where the water-soluble polyvalent metal cation-containing compound is added as an aqueous solution, a hydrophilic organic solvent (an alcohol or a polyalkylene glycol) or a surfactant is used in combination in addition to water, and thereby dispersibility (solubility) or miscibility may be enhanced. The amount of water used may be appropriately determined depending on the kind of the additive or the addition method; however, for example, the amount of water is preferably 0 parts by mass (dry mixing) to 50 parts by mass, more preferably 0.1 parts to 10 parts by mass, and even more preferably 0.5 parts to 5 parts by mass per 100 parts by mass of the water-absorbing resin.

(Surfactant)

Furthermore, the particulate water-absorbing agent of the present invention may include a surfactant, and it is preferable that a step for mixing a surfactant may be included in any one of the steps of the production process.

By coating the surface of the particulate water-absorbing agent of the present invention with a surfactant, a particulate water-absorbing agent having a high water absorption speed and high liquid permeability is obtained. Furthermore, the surfactant is not particularly limited, and examples include the surfactants (nonionic surfactants, anionic surfactants, cationic surfactants, and amphoteric surfactants) disclosed in WO 97/017397 A and U.S. Pat. No. 6,107,358. These surfactants may also be compounds that are polymerizable or reactive with the acrylic acid (salt)-based monomer or the water-absorbing resin powder.

The kind of a surfactant or the amount to use thereof may appropriately be determined. The amount to use the surfactant is preferably 0 parts to 0.5 parts by mass, more preferably 0.00001 parts to 0.1 parts by mass, and even more preferably 0.001 parts to 0.05 parts by mass per 100 parts by mass of the water-absorbing resin. Regarding the kind of the surfactant, from the viewpoint of effects, it is preferable to use an anionic surfactant, a nonionic surfactant, or a silicone-based surfactant, and it is more preferable to use a nonionic surfactant or a silicone-based surfactant.

(Coloration Inhibitor and Urine Resistance Enhancer)

It is preferable that the particulate water-absorbing agent of the present invention further includes, for the purpose of preventing coloration or preventing deterioration (reduction of other residual monomers), a coloration inhibitor or a urine resistance enhancer selected from a chelating agent (particularly, an organic phosphorus-based chelating agent or an aminocarboxylic acid-based chelating agent), an $\alpha$-hydroxy-carboxylic acid (particularly, lactic acid) (salt), and an inorganic or organic reducing agent (particularly, a sulfur-based inorganic reducing agent). Furthermore, a particulate water-absorbing agent having a large surface area generally tends be colored or deteriorated.

Examples of the chelating agent include the chelating agents disclosed in U.S. Pat. Nos. 6,599,989, 6,469,080, EP 2,163,302, and the like. Among them, a non-polymer chelating agent is preferred, and an organic phosphorus-based chelating agent and an aminocarboxylic acid-based chelating agent are more preferred. Examples of the $\alpha$-hydroxy-carboxylic acid (salt) include malic acid (salts), succinic acid (salts), and lactic acid (salts) disclosed in US 2009/0,312,183 A. Examples of the inorganic or organic reducing agent include the sulfur-based reducing agents disclosed in US 2010/0,062,252 and the like, and among them, sulfurous acid salts or hydrogen sulfurous acid salts are preferred.

The amount to use the coloration inhibitor or the urine resistance enhancer is preferably 0 parts to 3 parts by mass, more preferably 0.001 parts to 1 part by mass, and particularly preferably 0.05 parts to 0.5 parts by mass per 100 parts by mass of the water-absorbing resin powder.

The coloration inhibitor or the urine resistance (weather resistance) enhancer can be added to the monomers, hydrogel, dry polymer, water-absorbing resin powder, or the like; however, it is preferable to add the agents in or after the polymerization step. Particularly, since the inorganic or organic reducing agent is consumed in the polymerization step, the coloration inhibitor or the urine resistance enhancer is preferably added after the polymerization step, more preferably after the drying step, and even more preferably after the surface crosslinking step.

In addition to those, the water-soluble polysiloxanes described in WO 2009/093708 A, the primary to tertiary amine compounds described in WO 2008/108343 A, and the like can be preferably used.

(Dust Removing Agent)

It is preferable that the water-absorbing agent of the present invention further includes a dust removing agent such as a polyol or polyethylene glycol, for the purpose of suppressing the generation of dust. The amount to use the dust removing agent is preferably 0 parts to 3 parts by mass, more preferably 0.001 parts to 1 part by mass, and even more preferably 0.05 parts to 0.5 parts by mass per 100 parts by mass of the water-absorbing resin powder.

(3) Physical Properties of Particulate Water-Absorbing Agent

In regard to the particulate water-absorbing agent related to the present invention, in a case where the particulate water-absorbing agent is used in absorbent articles such as disposable diapers, it is preferable that the particulate water-absorbing agent satisfies, among the physical properties listed in the following items (3-1) to (3-8), at least one or more, preferably two or more including AAP, more preferably three or more including AAP, and preferably four or more, five or more, six or more, or seven or more in this order. It is most preferable that all of the physical properties are controlled to the desired ranges.

The physical properties to be controlled can be appropriately selected according to the use and the like of the particulate water-absorbing agent to be obtained. Furthermore, it is also preferable that a water-absorbing resin powder in which the water-insoluble phosphate is not added after surface crosslinking, satisfies the physical properties of the following items (3-1) to (3-8).

(3-1) AAP (Fluid Retention Capacity Under Pressure)

It is preferable that the particulate water-absorbing agent and the water-absorbing resin powder after surface crosslinking according to the present invention have predetermined AAP values. The lower limit of the fluid retention capacity for a 0.9 mass % aqueous sodium chloride solution under a pressure of 2.06 kPa (AAP) is 20 g/g or more, preferably 25 g/g or more, and more preferably 30 g/g or more. Meanwhile, although it is more preferable as the AAP is higher, from the viewpoint of a balance between the AAP and other physical properties (for example, CRC), the upper limit value is preferably 40 g/g or less, more preferably 35 g/g or less, and even more preferably 33 g/g or less. Therefore, the upper limit and the lower limit of the AAP can be appropriately selected within the range described above, and for example, the AAP value is from 20 g/g to 40 g/g, from 25 g/g to 35 g/g, or from 30 g/g to 33 g/g. Meanwhile, the AAP can be controlled by s surface crosslinking step.

(3-2) CRC (Fluid Retention Capacity without Pressure)

It is preferable that the particulate water-absorbing agent and the water-absorbing resin powder after surface crosslinking related to the present invention have predetermined CRC's. The lower limit of the fluid retention capacity without pressure (CRC) is preferably 25 g/g or more, more preferably 30 g/g or more, and even more preferably 33 g/g or more. When the fluid retention capacity without pressure is higher than or equal to the values described above, the water absorption efficiency in the case of using the particulate water-absorbing agent in absorbent articles such as disposable diapers is increased. Meanwhile, although it is more preferable as the CRC is higher, from the balance between CRC and other properties (for example, AAP), the upper limit value is preferably 60 g/g or less, more preferably 50 g/g or less, even more preferably 45 g/g or less, and particularly preferably 41 g/g or less. Therefore, the upper limit and the lower limit of the CRC can be appropriately selected within the range described above, and for example, the CRC may be from 25 g/g to 60 g/g, from 30 g/g to 50 g/g, from 33 g/g to 45 g/g, or the like. The CRC can be controlled with the crosslink density at the time of polymerization or surface crosslinking.

(3-3) Solids Content

The solids content of the particulate water-absorbing agent and the water-absorbing resin powder after surface crosslinking related to the present invention is a value calculated by the method described in the Examples, and the solids content is preferably 85% to 99% by mass, more preferably 88% to 98% by mass, and even more preferably 90% to 95% by mass. When the solids content is 85% by mass or more, the fluid retention capacity without pressure or the fluid retention capacity under pressure can be prevented from decreasing. On the other hand, when the solids content is 98% by mass or less, decrease of the fluid retention capacity under pressure caused by mechanical damage resulting from conveyance or the like can be suppressed.

(3-4) Moisture Absorption Blocking Ratio

The moisture absorption blocking properties of the particulate water-absorbing agent and the water-absorbing resin powder after surface crosslinking related to the present invention can be evaluated based on the moisture absorption blocking ratio calculated by the method described in the Examples. It is more preferable that the moisture absorption blocking ratio is low, and specifically, the ratio is preferably 30% by mass or less, more preferably 28% by mass or less, and even more preferably 26% by mass or less. The lower limit becomes 0% by mass or more, according to the principle of calculation. When the moisture absorption blocking ratio is controlled to such a low value, a particulate water-absorbing agent that is stable under any operating environment or any user-defined use conditions (for example, the operating conditions for a disposable diaper production process) can be used.

(3-5) Extr.

The Extr. (water soluble component) of the particulate water-absorbing agent and the water-absorbing resin powder after surface crosslinking related to the present invention is preferably 5% to 30% by mass, more preferably 5% to 25% by mass, and even more preferably 5% to 20% by mass. When the Extr. is 30% by mass or less, the gel strength of the particulate water-absorbing agent and the water-absorbing resin powder after surface crosslinking does not become too weak, and excellent liquid permeability can be exhibited. Furthermore, in a case where the particulate water-absorbing agent is used in an absorbent body such as a disposable diaper, the return of liquid (rewetting) when pressure is applied to the absorbent body is decreased, which is preferable.

Meanwhile, the Extr. can be appropriately controlled using the internal crosslinking agent or the like mentioned above. However, in order to obtain a particulate water-absorbing agent or water-absorbing resin powder having an Extr. of less than 5% by mass, it is necessary to use a large amount of an internal crosslinking agent. In addition to cost increase (exceeding the detection limit) and generation of a residual amount of the crosslinking agent, the CRC is markedly decreased, which is not preferable.

(3-6) Amount of Deteriorated Soluble Contents

The amount of deteriorated soluble contents (deteriorated Extr.) is an index representing the amount of dissolution of a particulate water-absorbing agent that has changed over time, in physiological saline containing L-ascorbic acid. The details of the testing method will be explained in the Examples described below.

The amount of deteriorated soluble contents of the particulate water-absorbing agent and the water-absorbing resin powder after surface crosslinking related to the present invention is preferably 0% to 30% by mass, more preferably 1% to 28% by mass, and even more preferably 2% to 25% by mass. When the amount of deteriorated soluble contents is 30% by mass or less, deterioration such as cutting of the polymer chain of the particulate water-absorbing agent or the water-absorbing resin powder does not easily occur, and unpleasantness such as sliminess caused by long time use of an absorbent article such as a disposable diaper can be suppressed.

Meanwhile, the technique for increasing the amount of deteriorated soluble contents is not particularly limited; however, the following production methods 1 to 3 may be employed. According to the present invention, the particulate water-absorbing agent to be obtained can be appropriately selected according to the purpose.

Production method 1: A method of crosslinking and polymerizing an aqueous acrylic acid (salt)-based monomer solution including acrylic acid (salt) as a main component in the presence of an internal crosslinking agent and a chain transfer agent, subsequently adjusting the particle size to a particular particle size distribution, and surface crosslinking the water-absorbing resin powder thus obtained.

Production method 2: A method of crosslinking and polymerizing an aqueous monomer solution containing unneutralized acrylic acid as a main component in the presence of an internal crosslinking agent, subsequently neutralizing the resultant, subsequently adjusting the particle size to a particular particle size distribution, and surface crosslinking the water-absorbing resin powder thus obtained.

Production method 3: A method of crosslinking and polymerizing an aqueous acrylic acid (salt)-based monomer solution including acrylic acid (salt) as a main component in the presence of an internal crosslinking agent, subsequently adjusting the particle size to a particular particle size distribution, and surface crosslinking the water-absorbing resin powder particles thus obtained. Meanwhile, a chelating agent is added at any one or more time points of "during polymerization", "before surface crosslinking", "during surface crosslinking", and "after surface crosslinking".

(3-7) Particle Size

The particle size or particle size distribution of the particulate water-absorbing agent and the water-absorbing resin powder after surface crosslinking related to the present invention is not particularly limited; however, it is preferable that after the final surface post-crosslinking agent has been added and mixed, the particles are subjected to particle size regulation to the range described below (defined by sieve classification).

The upper limit of the particle size is preferably less than 1 mm. If a large amount of particles having a size of 1 mm or more (particularly particles having a size of 850 µm or more) are included, particularly when the particulate water-absorbing agent is used in a thin type absorbent article, not only a wearer may feel unpleasant, but also there is a risk that the particulate water-absorbing agent may damage a water-impermeable material that constitutes the absorbent article, so-called a back sheet, and leakage of urine or the like may be brought about during actual use. Therefore, it is not preferable. Accordingly, it is preferable that particles having a size of 850 µm or more is present in a smaller amount, and the amount of large particles is preferably 0% to 5% by mass, more preferably 0% to 3% by mass, and even more preferably 0% to 1% by mass, relative to the total amount of the particles, and it is particularly preferable that large particles are substantially not included.

On the other hand, the proportion of fine particles having a particle size of less than 150 mm is preferably 0% to 3% by mass, more preferably 0% to 2% by mass, and even more preferably 0% to 1.5% by mass. If the amount of fine particles in the particulate water-absorbing agent or the water-absorbing resin powder is small, adverse effects such as increase in dust, decrease in moisture absorption fluidity, and deterioration of physical properties such as AAP and liquid permeability can be suppressed.

Furthermore, while the particle size range described above is maintained, the particle size distribution of the particulate water-absorbing agent or the water-absorbing resin powder is preferably such that the proportion of particles included in the range of 150 µm to 850 µm is 95% by mass or more, more preferably 98% by mass or more, and even more preferably 99% by mass or more, and it is most preferable that substantially the entire amount of the particles is included in the relevant range.

In regard to the particulate water-absorbing agent obtained as a water-absorbing resin or a final manufactured product through the production process described above, the mass average particle size (D50) defined by standard sieve classification is preferably 600 µm or less, and in order to enhance the performance, the mass average particle size is more preferably in the range of 550 µm to 200 µm, even more preferably in the range of 500 µm to 250 µm, and most preferably in the range of 450 µm to 300 µm. Furthermore, the proportion of particles having a particle size of less than 300 µm is preferably 10% by mass or more, more preferably in the range of 10% to 50% by mass, and even more preferably in the range of 10% to 30% by mass.

When the particle size and the particle size distribution are within the ranges described above, a well-balanced water-absorbing resin that maintains a desired fluid retention capacity and then has excellent liquid permeability can be obtained. Particularly, since particles having a particle size of less than 150 µm deteriorate liquid permeability and also, there is a risk that such fine particles may have adverse effects caused by dust generation and the like in the environment for production operation for absorbent articles that use a water-absorbing resin as a raw material. Therefore, it is more preferable that the amount of particles having a particle size of less than 150 µm is smaller.

The particle size can be appropriately controlled through crushing or classification (before the surface crosslinking step and/or after the surface crosslinking step), or by subjecting the particulate water-absorbing agent to granulation, the fine powder recycling step or the like.

(3-8) Shape

The shape of the particulate water-absorbing agent and the water-absorbing resin powder after surface crosslinking related to the present invention can be applied particularly to a sheet form, a fibrous form, a powder form, a gel form, or the like; however, a powder form having the particle size described above, and irregular-shaped particles are preferred. Here, an irregular shape is a particle shape obtained by crushing a gel or a dried product. Meanwhile, the particles may be a granulation product, or may be primary particles.

[4] Applications and the Like of Particulate Water-Absorbing Agent

The particulate water-absorbing agent related to the present invention is used in absorbent articles such as disposable diapers, sanitary napkins, incontinence pads, and medical pads. In that case, it is preferable that the particulate water-absorbing agent is used in a configuration in which includes (a) a liquid permeable top sheet that is disposed adjacently to the body of a wearer; (b) a back sheet that is impermeable to liquid, which is disposed away from the body of a wearer and is disposed adjacently to, for example, the clothes of the wearer; and a water-absorbing agent material disposed between the top sheet and the back sheet. The water-absorbing agent material may include two or more layers, or may be used together with a pulp layer or the like.

EXAMPLES

[5] Examples

Hereinafter, the present invention will be explained based on Examples; however, the present invention is not intended to be limitedly construed by way of the Examples. Furthermore, the various physical properties described in the claims or the present invention or in the Examples were determined according to the following measurement methods (5-1) to (5-7). Furthermore, unless particularly stated otherwise, the various processes in the various Examples were carried out at substantially normal pressure (±5% of the atmospheric pressure, more preferably within 1% of the atmospheric pressure), and identical processes were carried out without applying any pressure change caused by intentional pressurization or pressure reduction.

(5-1) Particle Size and Mass Average Particle Size (D50)

Particle size measurement of the particulate water-absorbing agent/water-absorbing resin powder related to the present invention was carried out according to the measurement method disclosed in EP 0,349,240.

That is, 10 g of a particulate water-absorbing agent was classified using JIS standard sieves (JIS Z8801-1 (2000)) having mesh sizes of 850 μm, 710 μm, 600 μm, 500 μm, 420 μm, 300 μm, 212 μm, 150 μm, 106 μm, and 45 μm, or sieves equivalent to these. The masses of the particles of the particulate water-absorbing agent/water-absorbing resin powder remaining on each sieve and the mass of the particulate water-absorbing agent/water-absorbing resin powder that had passed through all the sieves were respectively measured.

(5-2) CRC (Fluid Retention Capacity without Pressure)

The fluid retention capacity for 30 minutes without pressure (CRC) against a 0.90 mass % aqueous sodium chloride solution (also referred to as physiological saline) was determined according to ERT441.2-0.2.

(5-3) Fluid Retention Capacity Under Pressure (AAP)

Measurement of the fluid retention capacity under pressure (AAP) was carried out according to ERT442.2-02.

That is, 0.9 g of a particulate water-absorbing agent/water-absorbing resin powder (mass W1 [g]) was introduced into an analyzer, and the mass of the set of the analyzer (W2 [g]) was measured. Next, the particulate water-absorbing agent/water-absorbing resin powder was caused to absorb a 0.90 mass % aqueous solution of sodium chloride at a pressure of 2.06 kPa. After passage of one hour, the mass of the set of the analyzer (W3 [g]) was measured. The fluid retention capacity under pressure (AAP) was calculated according to the following formula (1) from W1 [g], W2 [g], and W3 [g] thus obtained.

$$AAP\ [g/g]=(W3-W2)/W1 \quad \text{(Formula 1)}$$

(5-4) Solids content

The solids content represents the proportion [mass %] occupied by components that do not volatilize at 180° C. in a particulate water-absorbing agent/water-absorbing resin powder. The relation thereof with the moisture content [mass %] is such that (solids content=100−moisture content).

The method for measuring the solids content was carried out as follows.

In an aluminum cup having a bottom diameter of about 5 cm (mass W4 [g]), about 1 g of a particulate water-absorbing agent/water-absorbing resin powder was weighed (mass W5 [g]), and left to stand for 3 hours in an airless dryer at 180° C. to dry. The total mass of the aluminum cup and the particulate water-absorbing agent/water-absorbing resin powder after drying (W6 [g]) was measured, and the solids content was determined from the following formula (2).

$$\text{Solids content [mass \%]}=\{(W6-W4)/W5\}\times 100 \quad \text{(Formula 2)}$$

(5-5) Moisture Absorption Blocking Ratio (Anti-Caking)

About 2 g of a particulate water-absorbing agent/water-absorbing resin powder was uniformly sprayed over an aluminum cup having a diameter of 52 mm, and then the aluminum cup was left to stand for 1 hour in a thermo-hygrostat (manufactured by Espec Corp.; Model: SH-641) adjusted to a temperature of 25° C. and a relative humidity of 90±5% RH.

Subsequently, the particulate water-absorbing agent/water-absorbing resin powder in the aluminum cup was gently transferred onto a JIS standard sieve (the IIDA Testing Sieve/inner diameter 80 mm) having a mesh size of 2,000 μm (8.6-mesh), and the particulate water-absorbing agent/water-absorbing resin powder was classified for 5 seconds using a RO-TAP type sieve shaker (manufactured by Sieve Factory Iida Co., Ltd.; ES-65 type sieve shaker/speed of rotation 230 rpm, frequency of impact: 130 rpm) under the conditions of a temperature of 20° C. to 25° C. and a relative humidity of 50% RH.

Subsequently, the particulate water-absorbing agent/water-absorbing resin powder remaining on the JIS standard sieve (mass W7 [g]) and the mass of the particulate water-absorbing agent/water-absorbing resin powder that had passed through the JIS standard sieve (mass W8 [g]) were measured, and the moisture absorption fluidity (moisture absorption blocking ratio) was calculated by the following formula (3). As the value of the moisture absorption blocking ratio is lower, superior moisture absorption fluidity is obtained.

$$\text{Moisture absorption blocking ratio [mass \%]}=(W7/(W7+W8))\times 100 \quad \text{(Formula 3)}$$

(5-6) Measurement of Crystallite Size of Water-Insoluble Metal Phosphate

Measurement of the crystallite size of a water-insoluble metal phosphate was carried out by powder X-ray diffraction (XRD) using a powder X-ray diffraction apparatus (manufactured by Spectris plc, product name: X' PERT PRO MPD). The measurement conditions are presented below.

X-ray source: CuKα radiation (λ=0.15406 nm)/45 kV/40 mA

Scan range: 2θ-20° to 40°

Step size: 0.017°

Scan step time: 50 seconds

A glass sample holder having a cavity (depth) of 0.5 mm was uniformly charged with a sample, and the surface of the charged sample was flattened using another glass plate from an external source. Subsequently, the glass plate filled with the sample was mounted in a powder X-ray diffraction apparatus, and the XRD pattern was obtained.

The crystallite size of the water-insoluble metal phosphate was calculated from Debye-Sherrer equation using the full width at half maximum of a diffraction peak having the highest relative intensity.

$$d=0.9\times\lambda\div(B\times\cos\theta) \quad \text{Deby-Sherrer equation:}$$

(d: crystallite size, λ: X-radiation wavelength, B: full width at half maximum of the diffraction peak, θ: diffraction angle 2θ/θ)

Regarding the crystallite size of a water-insoluble metal phosphate on a particulate water-absorbing agent, a particulate water-absorbing agent to which a water-insoluble metal phosphate had been added was subjected to an XRD analysis, and the crystallite size was determined.

Specifically, first, a particulate water-absorbing agent to which a water-insoluble metal phosphate had been added was classified using a JIS standard sieve (JIS Z8801-1 (2000)) having a mesh size of 106 μm or a sieve equivalent thereto, and 0.5 g of the particulate water-absorbing agent having a particle size of 106 μm or less was extracted. Subsequently, the particulate water-absorbing agent was subjected to an XRD analysis by a technique such as described above, and the crystallite size was calculated from the diffraction peaks thus obtained.

(5-7) Measurement of Average Primary Particle Size of Water-Insoluble Metal Phosphate The average primary particle size of a water-insoluble metal phosphate used for the present invention refers to the specific surface area sphere equivalent diameter of the water-insoluble metal phosphate. The specific surface area sphere equivalent diameter is the particle size calculated relative to the specific surface area determined according to the BET method by assuming the shape of the particles to be spherical, and the specific surface area sphere equivalent diameter is calculated from the following expression:

$$D=\{6/(Sg\times\rho)\}$$

Here,
D: specific surface area sphere equivalent diameter (Mm)
Sg: specific surface area (m²/g)
ρ: true specific gravity (g/cm³) of particles.

For the measurement of the specific surface area, an apparatus which measures the specific surface area by a nitrogen adsorption BET one-point method can be used, and for example, MACSORB HM Model-1210 manufactured by Mountech Co., Ltd. may be used. A specific measurement method is as follows.

First, a glass cell for exclusive use is charged with about 0.5 g of a measurement sample (hereinafter, the amount of sample filled is designated as a (g)). Subsequently, the cell for exclusive use is mounted in the main body of the measuring apparatus, drying and degassing is performed in a nitrogen atmosphere at 110° C. for 60 minutes, and then the cell for exclusive use is cooled to room temperature.

Subsequently, while the cell for exclusive use is cooled with liquid nitrogen, a gas for measurement (a mixed gas of 30% by volume of nitrogen (first grade) and 70% by volume of helium) was flowed into the cell for exclusive use at a flow rate of 25 ml/min, and the amount of adsorption (V (cm³)) of the gas for measurement onto the sample is measured.

The specific surface area Sg (m²/g) of the sample is calculated by applying the measured value obtained by the operation described above to the following expression.

$$Sg=S/a=(K\times(1-P/P0)\times V)/a$$

Here,
S: Total surface area of the sample (m²)
K: Gas constant (4.29 for the present measurement)
P/P₀: Relative pressure of the adsorbing gas, and this is 97% of the mixing ratio (0.29 for the present measurement).

Meanwhile, the following values were employed as true specific gravities for the present invention.
Calcium phosphate: 3.1 (g/cm³)
Aluminum phosphate: 2.6 (g/cm³)
Apatite α-TCP: 2.6 (g/cm³)
NOVARON AGZ010: 5.1 (g/cm³)
Calcium phosphate TTCP: 3.1 (g/cm³)
AEROSIL 200CF: 2.2 (g/cm³)

(5-7) Elution Amount of Deteriorated Soluble Contents 200 g of a 0.90% by mass aqueous sodium chloride solution having 0.05% by mass of L-ascorbic acid dissolved therein (solution A) and 1 g of a water-absorbing resin (composition) were introduced into a 250-ml glass beaker, and the beaker was capped with a food wrapping film. The beaker and the content were left to stand for 2 hours at 60° C. Subsequently, a 35 mm rotor was introduced into the beaker, and the content of the beaker was stirred for 1 hour with a magnetic stirrer (about 500 rpm) and was filtered through a pleated filter paper (manufactured by Toyo Roshi Kaisha, Ltd., No. 2). 50 g of the filtrate thus obtained was placed in a 100-ml beaker, and the filtrate was subjected to acid-alkali titration.

First, the filtrate was titrated to pH 10 using a 0.1 N aqueous NaOH solution, and the titer Va (ml) was determined. Subsequently, the resultant was titrated to pH 2.7 using a 0.1 N aqueous HCl solution, and the titer Vb (ml) was determined. A similar operation was performed without introducing a water-absorbing resin (composition) to provide a blank, and the respective blank amounts, Vab and Vbb, were determined. From the numerical values thus obtained, the elution amount of deteriorated soluble contents of the particulate water-absorbing agent was calculated by the following expression.

Elution amount of deteriorated soluble contents (mass %)=0.1×Mw×200(amount of solution A)×100×(Vb−Vbb)/1000/1(particulate water-absorbing agent)/50(amount of filtrate used for titration)

Mw:Average molecular weight of polymer unit=72 (molecular weight of acrylic acid)×(1−N/100)+ 94(molecular weight of sodium acrylate)×N/100

N:Rate of neutralization of water-absorbing resin=− (((Va−Vab)/(Vb−Vbb))−1)×100

Production Example 1

0.38 g (0.006 mol % with respect to the monomers) of trimethylolpropane triacrylate (molecular weight 296) was dissolved in 5500 g (monomer concentration: 35% by mass) of an aqueous solution of sodium acrylate at a rate of neutralization of 75 mol %, and aqueous monomer solution (a) was prepared. Subsequently, the solution was degassed for 30 minutes in a nitrogen gas atmosphere.

Next, the aqueous monomer solution (a) described above was introduced into a reactor obtained by providing a lid to a double arm type jacketed stainless steel kneader having two sigma-shaped blades and having an internal volume of 10 L. Nitrogen gas was blown into the reactor while the liquid temperature was maintained at 30° C., and thus the reactor was purged with nitrogen so as to obtain a dissolved oxygen concentration of 1 ppm or less in the system.

Subsequently, 24.6 g of a 10 mass % aqueous sodium persulfate solution and 21.8 g of a 0.2 mass % aqueous L-ascorbic acid solution were separately added thereto while the aqueous monomer solution (a) was stirred, and polymerization started after about 1 minute. Polymerization was performed at 30° C. to 90° C. while a crosslinked hydrogel polymer (a) thus produced was crushed, and after a lapse of 60 minutes from the initiation of polymerization, crosslinked hydrogel polymer (c) was removed from the reactor. The crosslinked hydrogel polymer (a) thus obtained was finely granulated to a size of about 5 mm.

The finely granulated crosslinked hydrogel polymer (a) was spread on a wire gauze having a mesh size of 300 μm (50-mesh) and was hot air dried for 45 minutes at 180° C. Subsequently, the polymer was crushed with a roll mill, and was further classified with JIS standard sieves having mesh sizes of 850 μm and 150 μm. Through this series of operations, a water-absorbing resin powder (a) was obtained. The CRC (fluid retention capacity without pressure) of the water-absorbing resin powder (a) was 53.0 [g/g].

Next, 100 parts by mass of the water-absorbing resin powder (a) was uniformly mixed with a surface treating agent including 0.025 parts by mass of ethylene glycol diglycidyl ether (trade name: DENACOL EX-810, manufactured by Nagase ChemteX Corp.), 0.3 parts by mass of ethylene carbonate (melting point 36° C.), 0.5 parts by mass of 1,2-propanediol (melting point −59° C.), and 3.0 parts by mass of water. The mixture was heat treated for 40 minutes at 175° C. Subsequently, the mixture was passed through a JIS standard sieve having a mesh size of 850 μm, and thereby a surface-crosslinked water-absorbing resin powder (referred to as water-absorbing resin particles (1)) was obtained.

Production Example 2

In a container made of polypropylene that was covered with styrene foam as a thermally insulating material and had an inner diameter of 80 mm and a capacity of 1 liter, a solution (A) prepared by mixing 291 g of acrylic acid, 0.43 g (0.02 mol % with respect to the carboxyl group-containing unsaturated monomer) of polyethylene glycol diacrylate (molecular weight 523) as an internal crosslinking agent, and 3.60 g of a 1.0 mass % acrylic acid IRGACURE (registered trademark) 184 solution; and a solution (B) prepared by mixing 247 g of a 48.5 mass % aqueous sodium hydroxide solution and 255 g of ion-exchanged water that had been warmed to 50° C., were produced. Solution (B) was rapidly added to and mixed with solution (A) that was being stirred at 800 rpm using a magnetic stirrer having a length of 5 cm, and thereby aqueous monomer solution (C) was obtained. The liquid temperature of the aqueous monomer solution (C) increased to about 100° C. due to the heat of neutralization and the heat of dissolution. The rate of neutralization of acrylic acid was 73.5 mol %.

Next, 1.8 g of a 3 mass % aqueous sodium persulfate solution was added to the aqueous monomer solution (C), the mixture was stirred for about 1 second, and then the mixture was immediately poured into a stainless steel vat-type container lined with TEFLON (registered trademark) on the inner surface, in an open air system. Furthermore, simultaneously with pouring of the aqueous monomer solution into the stainless steel vat-type container, the aqueous monomer solution was irradiated with ultraviolet radiation.

Polymerization started not long after the pouring of the aqueous monomer solution into the vat, and polymerization reached a peak temperature within about 1 minute. After 3 minutes, irradiation with ultraviolet radiation was stopped, and a hydrous polymerization product was taken out. Meanwhile, this series of operations were carried out in an open air system.

The hydrous polymerization product thus obtained was crushed using a meat chopper (MEAT-CHOPPER Type: 12VR-400KSOX, Iizuka Kogyo Co., Ltd., die orifice diameter: 6.4 mm, number of orifices: 38, die thickness: 8 mm), and finely powdered crushed hydrous polymerization product particles were obtained.

These finely powdered crushed hydrous polymerization product particles were spread on a 50-mesh (mesh size: 300 μm) wire gauze, and were hot air dried at 180° C. The dried product was crushed with a roll mill, and the resultant was classified with JIS standard sieves having a mesh size of 850 μm and a mesh size of 150 μm. Thereby, water-absorbing resin powder (b), which was an irregular-shaped crushed water-absorbing resin (solids content: 96% by mass), was obtained. Furthermore, the CRC (fluid retention capacity without pressure) of the water-absorbing resin powder (b) was 47.3 [g/g]. Subsequently, 100 parts by mass of the water-absorbing resin powder (b) was uniformly mixed with a surface treating agent including 0.015 parts by mass of ethylene glycol diglycidyl ether, 1.0 parts by mass of propylene glycol, and 3.0 parts by mass of water, and the mixture was heat treated for 45 minutes at 100° C. Subsequently, the resultant was subjected to particle size regulation using a JIS standard sieve having a mesh size of 850 μm, and thereby, a surface-crosslinked water-absorbing resin powder (referred to as water-absorbing resin particles (2)) was obtained.

Production Example 3

The operation was carried out in the same manner as in Production Example 2, except that the amount of ethylene glycol diglycidyl ether was changed to 0.03 parts by mass in Production Example 2, and thus a surface-crosslinked water-absorbing resin powder (referred to as water-absorbing resin particles (3)) was obtained.

Hereinafter, in the Examples and Comparative Examples, the "particulate water-absorbing agent" will be described simply as "water-absorbing agent".

Example 1

100 parts by mass of the water-absorbing resin particles (1) obtained in Production Example 1 were mixed with 0.5 parts by mass of tricalcium phosphate having a crystallite size of 0.04 μm (average primary particle size: 0.04 μm) (manufactured by Wako Pure Chemical Industries, Ltd.). Mixing was carried out by introducing 30 g of the water-absorbing resin into a mayonnaise bottle having a capacity of 225 ml together with tricalcium phosphate, and mixing the components by means of vibration (for 3 minutes at room temperature) of a paint shaker (manufactured by Toyo Seiki Seisakusho, Ltd.), and thus water-absorbing agent (1) was obtained. The performance of the water-absorbing agent (1) is presented in the following Table 1. Furthermore, the results of particle size measurement for the water-absorbing agent (1) are presented in the following Table 2. The crystallite size of tricalcium phosphate included in the water-absorbing agent (1), which was determined by the measurement of the crystallite size of a water-insoluble metal phosphate on a water-absorbing agent as described above, was 0.03 μm.

Example 2

0.03 parts by mass of a 40 mass % aqueous pentasodium diethylenetriamine pentaacetate solution was added to and mixed with 100 parts by mass of the water-absorbing resin particles (2) obtained in Production Example 2, and the mixture was left to stand for 1 hour in a dryer at 60° C. Subsequently, 0.5 parts by mass of tricalcium phosphate having a crystallite size of 0.04 μm (average primary particle size: 0.04 μm) (manufactured by Wako Pure Chemical Industries, Ltd.) was mixed with the mixture. Mixing was carried out by introducing 30 g of the water-absorbing resin into a mayonnaise bottle having a capacity of 225 ml together with tricalcium phosphate, and mixing the components by means of vibration (for 3 minutes at room temperature) of a paint shaker (manufactured by Toyo Seiki Seisakusho, Ltd.), and thus water-absorbing agent (2) was obtained. The performance of the water-absorbing agent (2) is presented in the following Table 1. Furthermore, the results of particle size measurement for the water-absorbing agent (2) are presented in the following Table 2. The crystallite size of tricalcium phosphate included in the water-absorbing agent (2), which was determined by the measurement of the crystallite size of a water-insoluble metal phosphate on a water-absorbing agent as described above, was 0.03 μm.

Example 3

Water-absorbing agent (3) was obtained in the same manner as in Example 2, except that 0.5 parts by mass of the tricalcium phosphate having a crystallite size of 0.04 μm (manufactured by Wako Pure Chemical Industries, Ltd.) used in Example 2 was changed to 0.5 parts by mass of aluminum phosphate having a crystallite size of 0.1 m (average primary particle size: 0.1 μm). The performance of the water-absorbing agent (3) is presented in the following Table 1. The crystallite size of aluminum phosphate included in the water-absorbing agent (3), which was determined by the measurement of the crystallite size of a water-insoluble metal phosphate on a water-absorbing agent as described above, was 0.09 μm.

Example 4

0.03 parts by mass of a 40 mass % aqueous pentasodium diethylenetriamine pentaacetate solution was added to and mixed with 100 parts by mass of the water-absorbing resin particles (3) obtained in Production Example 3, and the mixture was left to stand for 1 hour in a dryer at 60° C. Subsequently, 0.5 parts by mass of tricalcium phosphate having a crystallite size of 0.04 μm (average primary particle size: 0.04 μm) (manufactured by Wako Pure Chemical Industries, Ltd.) was mixed with the mixture. Mixing was carried out by introducing 30 g of the water-absorbing resin into a mayonnaise bottle having a capacity of 225 ml together with tricalcium phosphate, and mixing the components by means of vibration (for 3 minutes at room temperature) of a paint shaker (manufactured by Toyo Seiki Seisakusho, Ltd.), and thus water-absorbing agent (4) was obtained. The performance of the water-absorbing agent (4) is presented in the following Table 1. Furthermore, the results of particle size measurement for the water-absorbing agent (4) are presented in the following Table 2. The crystallite size of tricalcium phosphate included in the water-absorbing agent (4), which was determined by the measurement of the crystallite size of a water-insoluble metal phosphate on a water-absorbing agent as described above, was 0.03 μm.

Comparative Example 1

Various physical properties are presented in Table 1 with the water-absorbing resin particles (1) described in Production Example 1 as a comparative water-absorbing agent (1). Furthermore, the results of particle size measurement for the comparative water-absorbing agent (1) are presented in Table 2.

Comparative Example 2

Various physical properties are presented in Table 1 with the water-absorbing resin particles (2) described in Production Example 2 as a comparative water-absorbing agent (2). Furthermore, the results of particle size measurement for the comparative water-absorbing agent (2) are presented in Table 2.

Comparative Example 3J

Various physical properties are presented in Table 1 with the water-absorbing resin particles (3) described in Production Example 3 as a comparative water-absorbing agent (3).

Comparative Example 4

A comparative water-absorbing agent (4) was obtained by mixing 100 parts by mass of the water-absorbing resin particles (2) obtained in Production Example 2 with 0.3 parts by mass of silica (product name: AEROSIL 200CF, manufactured by Nippon Aerosil Co., Ltd.) in the same manner as in Example 1. The performance of the comparative water-absorbing agent (4) is presented in the following Table 1. Furthermore, the results of particle size measurement for the comparative water-absorbing agent (4) are presented in the following Table 2.

Comparative Example 5

100 parts by mass of the water-absorbing resin particles (2) obtained in Production Example 2 were mixed with 0.5 parts by mass of an apatite α-TCP having a crystallite size of 0.17 μm (average primary particle size: 23 μm) (manufactured by Wako Pure Chemical Industries, Ltd.). Mixing was carried out by introducing 30 g of the water-absorbing resin into a mayonnaise bottle having a capacity of 225 ml, and mixing the components by means of vibration (for 3 minutes at room temperature) of a paint shaker (manufactured by Toyo Seiki Seisakusho, Ltd.), and thus a comparative water-absorbing agent (5) was obtained. The performance of the comparative water-absorbing agent (5) is presented in the following Table 1. The crystallite size of apatite α-TCP included in the comparative water-absorbing agent (5), which was determined by the measurement of the crystallite size of a water-insoluble metal phosphate on a water-absorbing agent as described above, was 0.16 μm.

Comparative Example 6

Comparative water-absorbing agent (6) was obtained in the same manner as in Comparative Example 5, except that the apatite α-TCP having a crystallite size of 0.17 μm used in Comparative Example was changed to 0.5 parts by mass of NOVARON AGZ010 (silver-based inorganic antibacterial agent manufactured by Toagosei Co., Ltd.) having a crystallite size of 0.22 μm (average primary particle size: 0.3 μm), which were inorganic particles containing Ag. The performance of the comparative water-absorbing agent (6) is presented in the following Table 1. The crystallite size of NOVARON AGZ010 included in the comparative water-absorbing agent (6), which was determined by the measurement of the crystallite size of a water-insoluble metal phosphate on a water-absorbing agent as described above, was 0.20 μm.

Comparative Example 7

100 parts by mass of the water-absorbing resin particles (1) obtained in Production Example 1 were mixed with 0.3 parts by mass of silica (product name: AEROSIL 200CF, manufactured by Nippon Aerosil Co., Ltd.) in the same manner as in Example 1, and thus comparative water-absorbing agent (7) was obtained. The performance of the comparative water-absorbing agent (7) is presented in the following Table 1.

Comparative Example 8

100 parts by mass of the water-absorbing resin particles (3) obtained in Production Example 3 were mixed with 1.0 parts by mass of calcium phosphate TTCP having a crystallite size of 0.16 μm (average primary particle size: 2.6 μm) (manufactured by Taihei Chemicals, Ltd.). Mixing was carried out by introducing 30 g of the water-absorbing resin into a mayonnaise bottle having a capacity of 225 ml, and mixing the components by means of vibration (for 3 minutes at room temperature) of a paint shaker (manufactured by Toyo Seiki Seisakusho, Ltd.), and thus a comparative water-absorbing agent (8) was obtained. The performance of the comparative water-absorbing agent (8) is presented in the following Table 1. The crystallite size of calcium phosphate TTCP included in the comparative water-absorbing agent (8), which was determined by the measurement of the crystallite size of a water-insoluble metal phosphate on a water-absorbing agent as described above, was 0.16 μm.

Example 5

Water-absorbing agent (5) was obtained in the same manner as in Example 4, except that the amount of tricalcium phosphate used in Example 4 was changed from 0.5 parts by mass to 0.15 parts by mass. The performance of the water-absorbing agent (5) is presented in the following Table 1. The crystallite size of tricalcium phosphate included in the water-absorbing agent (5), which was determined by the measurement of the crystallite size of a water-insoluble metal phosphate on a water-absorbing agent as described above, was 0.03 μm.

Example 6

Water-absorbing agent (6) was obtained in the same manner as in Example 4, except that the amount of tricalcium phosphate used in Example 4 was changed from 0.5 parts by mass to 0.3 parts by mass. The performance of the water-absorbing agent (6) is presented in the following Table 1. The crystallite size of tricalcium phosphate included in the water-absorbing agent (6), which was determined by the measurement of the crystallite size of a water-insoluble metal phosphate on a water-absorbing agent as described above, was 0.03 μm.

Example 7

Water-absorbing agent (7) was obtained in the same manner as in Example 3, except that the amount of aluminum phosphate used in Example 3 was changed from 0.5 parts by mass to 0.8 parts by mass. The performance of the water-absorbing agent (7) is presented in the following Table 1. The crystallite size of aluminum phosphate included in the water-absorbing agent (7), which was determined by the measurement of the crystallite size of a water-insoluble metal phosphate on a water-absorbing agent as described above, was 0.09 μm.

Example 8

Water-absorbing agent (8) was obtained in the same manner as in Example 3, except that the amount of aluminum phosphate used in Example 3 was changed from 0.5 parts by mass to 1.0 part by mass. The performance of the water-absorbing agent (8) is presented in the following Table 1. The crystallite size of aluminum phosphate included in the water-absorbing agent (8), which was determined by the measurement of the crystallite size of a water-insoluble metal phosphate on a water-absorbing agent as described above, was 0.09 μm.

Example 9

Water-absorbing agent (9) was obtained in the same manner as in Example 4, except that the amount of tricalcium phosphate used in Example 4 was changed from 0.5 parts by mass to 2.0 parts by mass. The performance of the water-absorbing agent (9) is presented in the following Table 1. The crystallite size of tricalcium phosphate included in the water-absorbing agent (9), which was determined by the measurement of the crystallite size of a water-insoluble metal phosphate on a water-absorbing agent as described above, was 0.03 μm.

TABLE 1

| | Water-absorbing agent | Water-absorbing resin | Additive Kind | Crystallite size (before addition) (μm) | Crystallite size (after addition) (μm) | Average primary particle size (before addition) (μm) | Amount of addition (mass %) | CRC (g/g) | AAP (g/g) | Moisture absorption blocking ratio (%) | Amount of deteriorated soluble contents (%) |
|---|---|---|---|---|---|---|---|---|---|---|---|
| Example 1 | Water-absorbing agent (1) | Water-absorbing resin (1) | Tricalcium phosphate | 0.04 | 0.03 | 0.04 | 0.5 | 42.9 | 29.1 | 0 | 86.6 |
| Example 2 | Water-absorbing agent (2) | Water-absorbing resin (2) | Tricalcium phosphate | 0.04 | 0.03 | 0.04 | 0.5 | 37.6 | 31.9 | 0 | 20.5 |
| Example 3 | Water-absorbing agent (3) | Water-absorbing resin (2) | Aluminum phosphate | 0.1 | 0.09 | 0.1 | 0.5 | 37.8 | 30.0 | 22 | 19.3 |
| Example 4 | Water-absorbing agent (4) | Water-absorbing resin (3) | Tricalcium phosphate | 0.04 | 0.03 | 0.04 | 0.5 | 34.5 | 31.9 | 0 | 18.2 |
| Comparative Example 1 | Comparative water-absorbing agent (1) | Water-absorbing resin (1) | — | — | — | — | 0 | 43.0 | 29.0 | 100 | 86.3 |
| Comparative Example 2 | Comparative water-absorbing agent (2) | Water-absorbing resin (2) | — | — | — | — | 0 | 37.6 | 31.3 | 100 | 75.2 |

TABLE 1-continued

| | Water-absorbing agent | Water-absorbing resin | Additive Kind | Crystallite size (before addition) (μm) | Crystallite size (after addition) (μm) | Average primary particle size (before addition) (μm) | Amount of addition (mass %) | CRC (g/g) | AAP (g/g) | Moisture absorption blocking ratio (%) | Amount of deteriorated soluble contents (%) |
|---|---|---|---|---|---|---|---|---|---|---|---|
| Comparative Example 3 | Comparative water-absorbing agent (3) | Water-absorbing resin (3) | — | — | — | — | 0 | 34.5 | 31.9 | 100 | 69.8 |
| Comparative Example 4 | Comparative water-absorbing agent (4) | Water-absorbing resin (2) | AEROSIL | — | — | 0.01 | 0.3 | 37.7 | 25.6 | 0 | 74.8 |
| Comparative Example 5 | Comparative water-absorbing agent (5) | Water-absorbing resin (2) | Apatite a-TCP | 0.17 | 0.16 | 23 | 0.5 | 37.2 | 29.0 | 100 | 75.4 |
| Comparative Example 6 | Comparative water-absorbing agent (6) | Water-absorbing resin (2) | NOVARON AGZ010 | 0.22 | 0.20 | 0.3 | 0.5 | 36.6 | 27.3 | 99 | 82.2 |
| Comparative Example 7 | Comparative water-absorbing agent (7) | Water-absorbing resin (2) | AEROSIL | — | — | 0.01 | 0.3 | 42.3 | 18.8 | 0 | 85.1 |
| Comparative Example 8 | Comparative water-absorbing agent (8) | Water-absorbing resin (3) | TTCP | 0.16 | 0.16 | 2.6 | 1.0 | 34.0 | 30.8 | 100 | 70.3 |
| Example 5 | Water-absorbing agent (5) | Water-absorbing resin (3) | Tricalcium phosphate | 0.04 | 0.03 | 0.04 | 0.15 | 34.7 | 32.0 | 28 | 18.5 |
| Example 6 | Water-absorbing agent (6) | Water-absorbing resin (3) | Tricalcium phosphate | 0.04 | 0.03 | 0.04 | 0.3 | 34.6 | 31.8 | 7 | 19.0 |
| Example 7 | Water-absorbing agent (7) | Water-absorbing resin (2) | Aluminum phosphate | 0.1 | 0.09 | 0.1 | 0.8 | 37.5 | 29.5 | 0 | 19.0 |
| Example 8 | Water-absorbing agent (8) | Water-absorbing resin (2) | Aluminum phosphate | 0.1 | 0.09 | 0.1 | 1.0 | 37.2 | 29.0 | 0 | 19.2 |
| Example 9 | Water-absorbing agent (9) | Water-absorbing resin (3) | Tricalcium phosphate | 0.04 | 0.03 | 0.04 | 2.0 | 33.5 | 30.5 | 0 | 18.5 |

As shown in Comparative Examples 5 and 6, when the crystallite size is 0.15 mm or more, a moisture absorption blocking resistance effect can be hardly obtained. Furthermore, in Comparative Example 4 and Comparative Example 7 using AEROSIL, which is fine particles of silicon dioxide, the fluid retention capacity under pressure was significantly decreased.

The particle size distribution, D50, and σζ of the water-absorbing agents are presented in Table 2.

TABLE 2

| | | Water-absorbing agent (1) | Water-absorbing agent (2) | Water-absorbing agent (4) | Comparative water-absorbing agent (1) | Comparative water-absorbing agent (2) | Comparative water-absorbing agent (3) | Comparative water-absorbing agent (4) |
|---|---|---|---|---|---|---|---|---|
| on 850 μm | (%) | 0.0 | 0.0 | 0.0 | 0.0 | 0.0 | 0.0 | 0.0 |
| on 600 μm | (%) | 20.1 | 1.0 | 5.2 | 19.7 | 0.7 | 4.9 | 22.2 |
| on 500 μm | (%) | 24.1 | 13.2 | 17.1 | 21.2 | 9.8 | 17.1 | 23.9 |
| on 300 μm | (%) | 35.9 | 57.1 | 53.6 | 37.5 | 56.8 | 54.9 | 35.4 |
| on 150 μm | (%) | 18.5 | 26.7 | 22.5 | 20.6 | 30.6 | 22.2 | 17.7 |
| on 45 μm | (%) | 1.4 | 2.0 | 1.6 | 0.9 | 2.1 | 0.9 | 0.8 |
| Thru 45 μm | (%) | 0.0 | 0.0 | 0.0 | 0.1 | 0.0 | 0.0 | 0.0 |

TABLE 2-continued

|  |  | Water-absorbing agent (1) | Water-absorbing agent (2) | Water-absorbing agent (4) | Comparative water-absorbing agent (1) | Comparative water-absorbing agent (2) | Comparative water-absorbing agent (3) | Comparative water-absorbing agent (4) |
|---|---|---|---|---|---|---|---|---|
| D50 | (μm) | 464 | 358 | 383 | 445 | 343 | 385 | 476 |
| σξ |  | 0.40 | 0.35 | 0.35 | 0.41 | 0.34 | 0.34 | 0.38 |

The invention claimed is:

1. A particulate water-absorbing agent comprising a water-absorbing resin as a main component, and further including a water-insoluble metal phosphate including an anion of a phosphoric acid compound and a divalent or trivalent metal cation, the water-insoluble metal phosphate having a crystallite size of less than 0.15 μm,
wherein a proportion of particles included in a range of 150 μm to 850 μm is 95% by mass or more, particles having a size of 850 μm or more is 0% to 5% by mass, and a proportion of the fine particles having a particle size of less than 150 μm is 0% to 3% by mass,
the particulate water-absorbing agent has a fluid retention capacity under pressure of 2.06 kPa of 20 g/g or more, and
a moisture absorption blocking ratio after standing 1 hour at a temperature of 25° C. and a relative humidity of 90±5% RH is 30% by mass or less.

2. The particulate water-absorbing agent according to claim 1, wherein an average primary particle size of the water-insoluble metal phosphate is less than 2.0 μm.

3. The particulate water-absorbing agent according to claim 1, wherein the water-insoluble metal phosphate includes at least one salt formed from:
an anion of phosphoric acid selected from the group consisting of a phosphate ion, a pyrophosphate ion, a tripolyphosphate ion, a hexapolyphosphate ion, a pentapolyphosphate ion, a heptapolyphosphate ion, a trimetaphosphate ion, a tetrametaphosphate ion, a hexametaphosphate ion, a dihydrogen phosphate ion and a hydrogen phosphate ion; and
a divalent or trivalent metal cation selected from the group consisting of a calcium ion, a magnesium ion, a strontium ion, a barium ion, a zinc ion, an iron ion, an aluminum ion, a titanium ion, a zirconium ion, a hafnium ion, a tin ion, a cerium ion, a scandium ion, a yttrium ion and a lanthanum ion.

4. The particulate water-absorbing agent according to claim 1, wherein an amount of the water-insoluble metal phosphate added is 0.01 to 2 parts by weight per 100 parts by weight of the water-absorbing resin.

5. The particulate water-absorbing agent according to claim 1, wherein a mass average particle size (D50) of the particulate water-absorbing agent is 600 μm or less.

6. The particulate water-absorbing agent according to claim 1, wherein a CRC of the particulate water-absorbing agent is 60 g/g or less.

7. The particulate water-absorbing agent according to claim 1, wherein an amount of deteriorated soluble contents of the particulate water-absorbing agent is 30% or less.

8. The particulate water-absorbing agent according to claim 1, further comprising a chelating agent.

9. The particulate water-absorbing agent according to claim 1, further comprising a dust removing agent.

10. The particulate water-absorbing agent according to claim 9, wherein the dust removing agent is selected from a group consisting of polyol and polyethylene glycol.

11. The particulate water-absorbing agent according to claim 9, wherein an amount of the dust removing agent is 0.001 parts to 1 part by mass per 100 parts by mass of the water-absorbing resin.

12. The particulate water-absorbing agent according to claim 9, wherein the water-absorbing resin is a surface crosslinked water-absorbing resin.

13. The particulate water-absorbing agent according to claim 12, wherein a surface crosslinking agent is selected from a group consisting of a polyhydric alcohol compound, an alkylene carbonate compound, and an oxazolidinone compound.

* * * * *